(12) United States Patent
Park et al.

(10) Patent No.: US 11,624,527 B2
(45) Date of Patent: Apr. 11, 2023

(54) SMOKE TUBE BOILER

(71) Applicant: KYUNGDONG NAVIEN CO., LTD., Pyeongtaek-si (KR)

(72) Inventors: Jun Kyu Park, Seoul (KR); Sung Jun Ahn, Seoul (KR); Hyun Muk Lim, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 0 days.

(21) Appl. No.: 16/771,651

(22) PCT Filed: Dec. 11, 2018

(86) PCT No.: PCT/KR2018/015662
§ 371 (c)(1),
(2) Date: Jun. 10, 2020

(87) PCT Pub. No.: WO2019/132324
PCT Pub. Date: Jul. 4, 2019

(65) Prior Publication Data
US 2020/0363099 A1   Nov. 19, 2020

(30) Foreign Application Priority Data

Dec. 29, 2017   (KR) .................. 10-2017-0183573

(51) Int. Cl.
*F24H 8/00* (2022.01)
*F24H 9/1836* (2022.01)
(Continued)

(52) U.S. Cl.
CPC .......... *F24H 8/006* (2013.01); *F24H 9/1836* (2013.01); *F23D 14/02* (2013.01); *F23D 14/78* (2013.01);
(Continued)

(58) Field of Classification Search
CPC .......... F23C 3/004; F24H 1/206; F24H 8/006; F24H 9/0026; F24H 1/36; F24H 1/08;
(Continued)

(56) References Cited

U.S. PATENT DOCUMENTS 2,990,877 A * 7/1961 Tramontini .......... B60H 1/2212
431/352
3,823,704 A * 7/1974 Daugirda ................ F23D 14/36
122/18.4
(Continued)

FOREIGN PATENT DOCUMENTS

CN  104937340 A   9/2015
CN  105051464 A   11/2015
(Continued)

OTHER PUBLICATIONS

European Office Action dated Sep. 23, 2021, issued to European Application No. 18897335.8.
(Continued)

*Primary Examiner* — Michael G Hoang
*Assistant Examiner* — Andrew W Cheung
(74) *Attorney, Agent, or Firm* — Stein IP LLC

(57) ABSTRACT

The present subject matter relates to a smoke tube boiler including: a mix chamber, a heat exchanger, a firing rod assembly, a sealing means, and an air-cooled cooling means and a water-cooled cooling means.

17 Claims, 39 Drawing Sheets

(51) Int. Cl.
*F24H 9/00* (2022.01)
*F24H 9/20* (2022.01)
*F28D 21/00* (2006.01)
*F23N 1/02* (2006.01)
*F24H 1/28* (2022.01)
*F23D 14/02* (2006.01)
*F28D 7/16* (2006.01)
*F28F 1/02* (2006.01)
*F23D 14/78* (2006.01)

(52) U.S. Cl.
CPC ............ *F23D 2207/00* (2013.01); *F23N 1/02* (2013.01); *F24H 1/287* (2013.01); *F24H 9/0026* (2013.01); *F24H 9/2035* (2013.01); *F28D 7/1676* (2013.01); *F28D 2021/0024* (2013.01); *F28F 1/02* (2013.01)

(58) Field of Classification Search
CPC .......... F24H 1/287; F24H 9/02; F24H 9/1836; F24H 9/2035; F28D 2021/0024; F28D 7/1676; F23D 2900/14001; F23D 2207/00; F23D 14/78; F23D 14/02; F23N 1/02; F28F 1/02
USPC ...................................... 122/14.22
See application file for complete search history.

(56) References Cited

U.S. PATENT DOCUMENTS

| | | | | |
|---|---|---|---|---|
| 5,338,184 A | * | 8/1994 | Dalhuisen | F23N 5/003 431/328 |
| 6,129,545 A | * | 10/2000 | Kahlke | F24C 3/047 126/39 J |
| 8,512,034 B2 | * | 8/2013 | Young | F23Q 9/04 431/258 |
| 9,097,436 B1 | * | 8/2015 | Smelcer | F23N 3/00 |
| 2002/0092482 A1 | * | 7/2002 | Bodnar | F24H 8/00 122/15.1 |
| 2009/0165733 A1 | * | 7/2009 | Ferguson | F23C 5/08 431/258 |
| 2009/0223655 A1 | * | 9/2009 | Lovato | F24H 9/0026 165/177 |
| 2011/0146594 A1 | * | 6/2011 | Smelcer | F28F 1/06 165/181 |
| 2012/0080172 A1 | * | 4/2012 | Pacholski | F24H 1/287 165/157 |
| 2012/0291719 A1 | * | 11/2012 | Steinhafel | F24H 1/00 122/18.3 |
| 2013/0315681 A1 | | 11/2013 | Volokh | 407/53 |
| 2014/0373794 A1 | * | 12/2014 | Choi | F24H 1/287 122/18.1 |
| 2015/0056563 A1 | * | 2/2015 | Kim | F23D 14/04 431/354 |
| 2016/0061445 A1 | * | 3/2016 | Kim | F23D 14/60 431/354 |

FOREIGN PATENT DOCUMENTS

| | | | |
|---|---|---|---|
| EP | 2988066 A1 | 2/2016 | |
| JP | H 05-88544 U | 12/1993 | |
| KR | 10-2006-0001296 A | 1/2006 | |
| KR | 20-2011-0011328 U | 12/2011 | |
| KR | 10-2013-0074962 A | 7/2013 | |
| KR | 101331426 B1 * | 11/2013 | ............. F23N 1/022 |
| KR | 10-1400834 B1 | 5/2014 | |
| KR | 10-2014-0084599 A | 7/2014 | |
| KR | 10-2015-0115782 A | 10/2015 | |
| WO | WO 2017/171276 A1 | 10/2017 | |

OTHER PUBLICATIONS

Indian Office Action dated Dec. 29, 2021, issued to Indian Application No. 202034027277.

* cited by examiner

【FIG. 1】
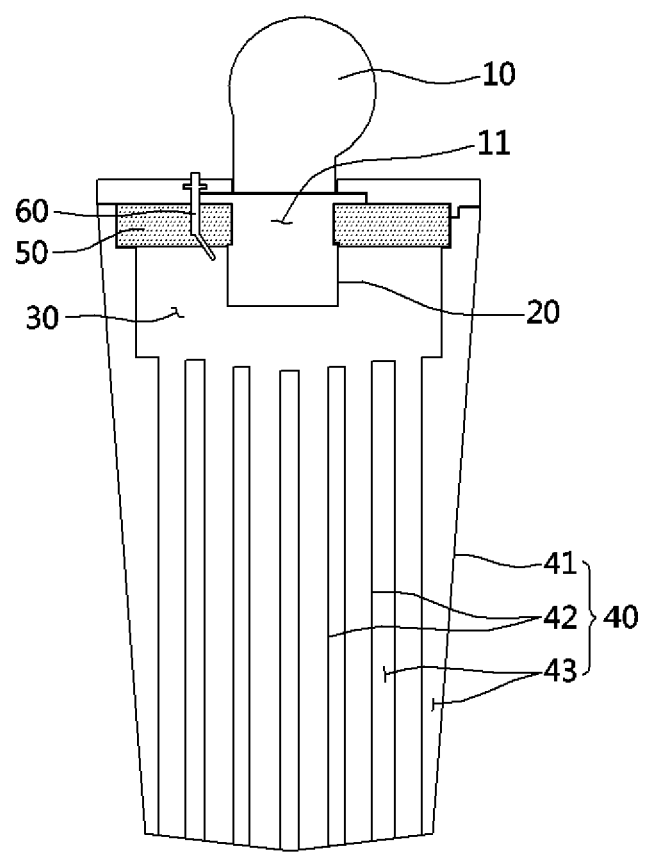
PRIOR ART

【FIG. 2】
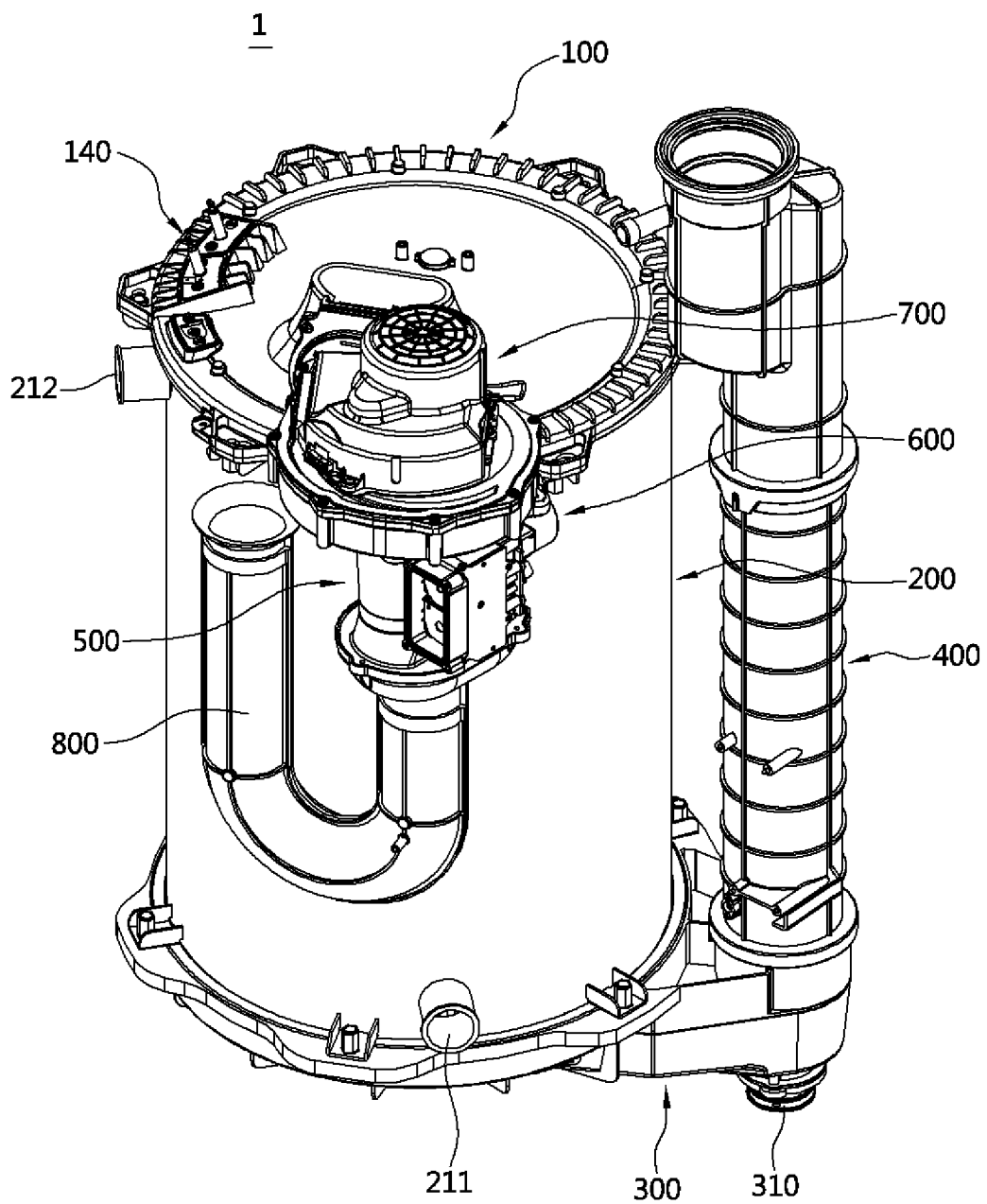

【FIG. 3】
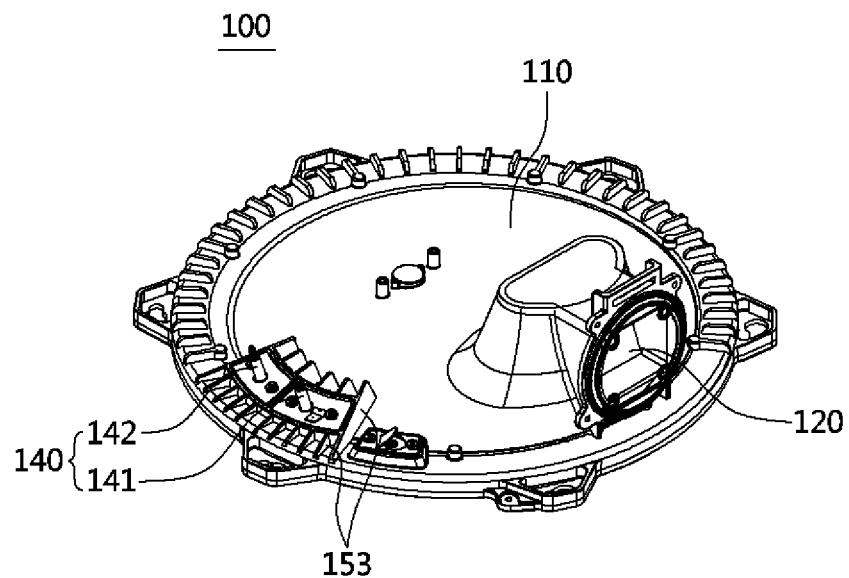
【FIG. 4】
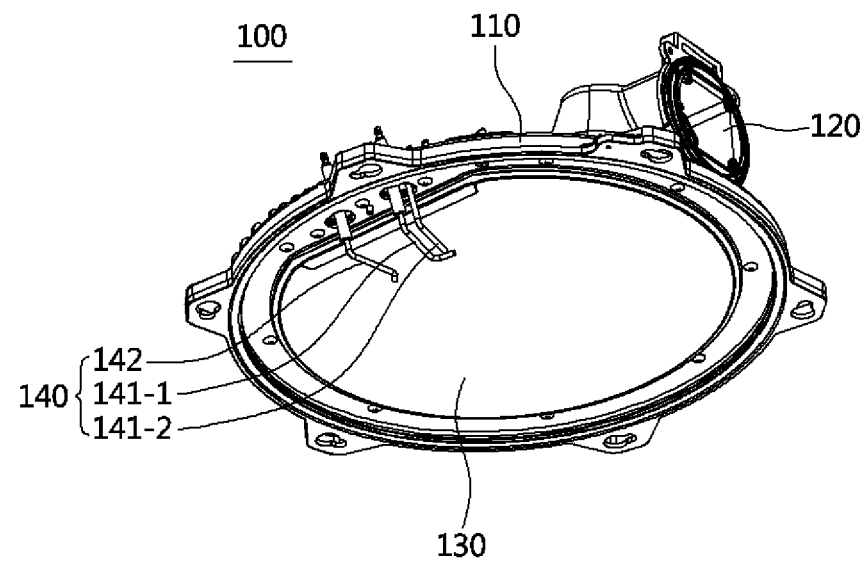

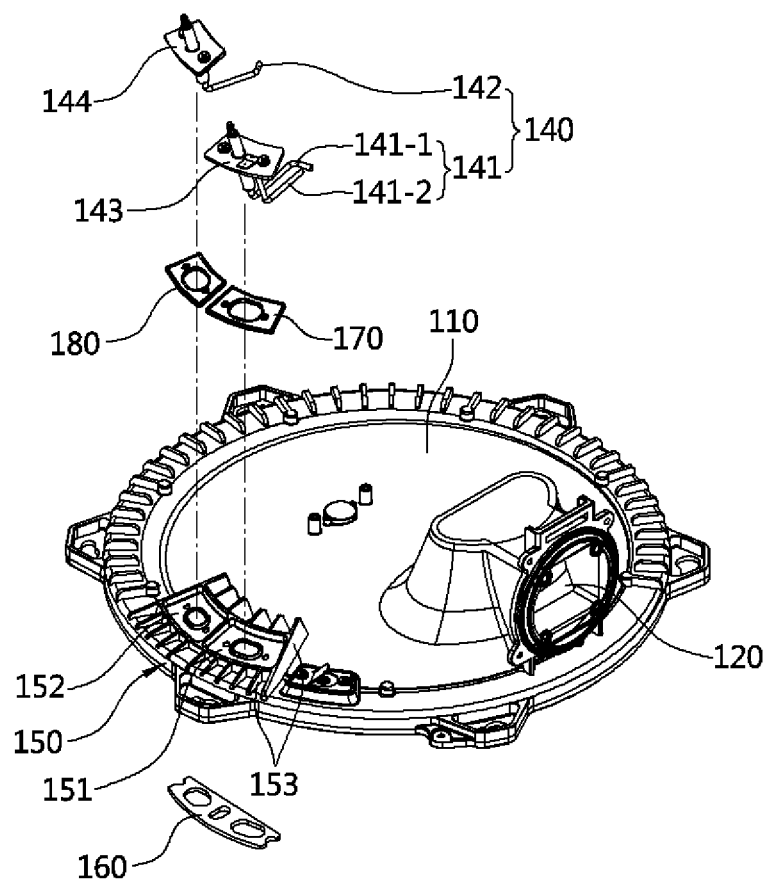
[FIG. 5]

[FIG. 6]
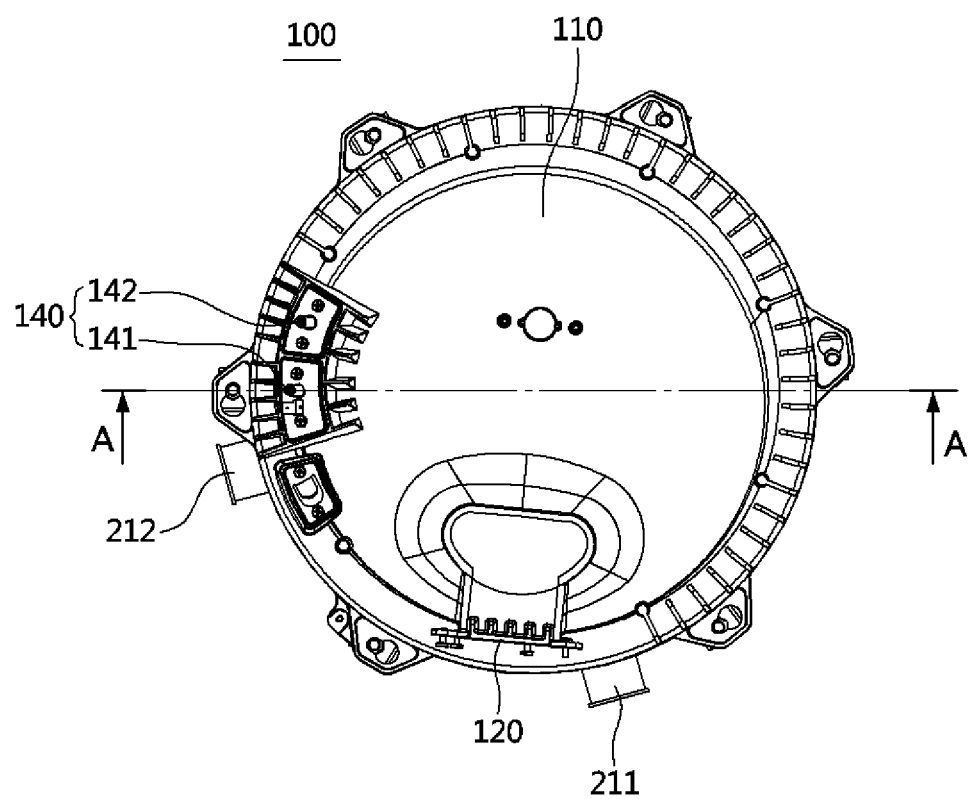

[FIG. 7]
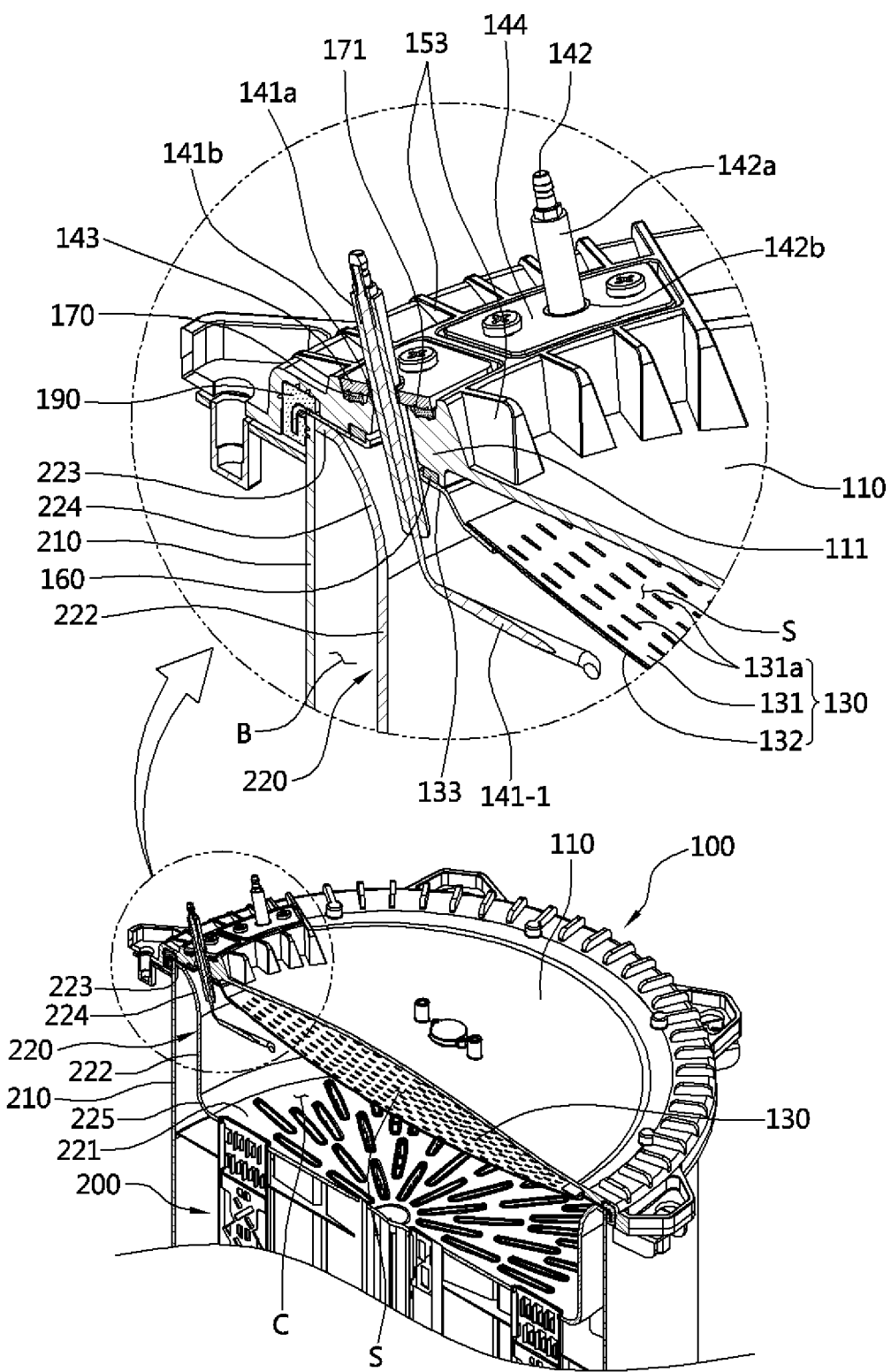

[FIG. 10]
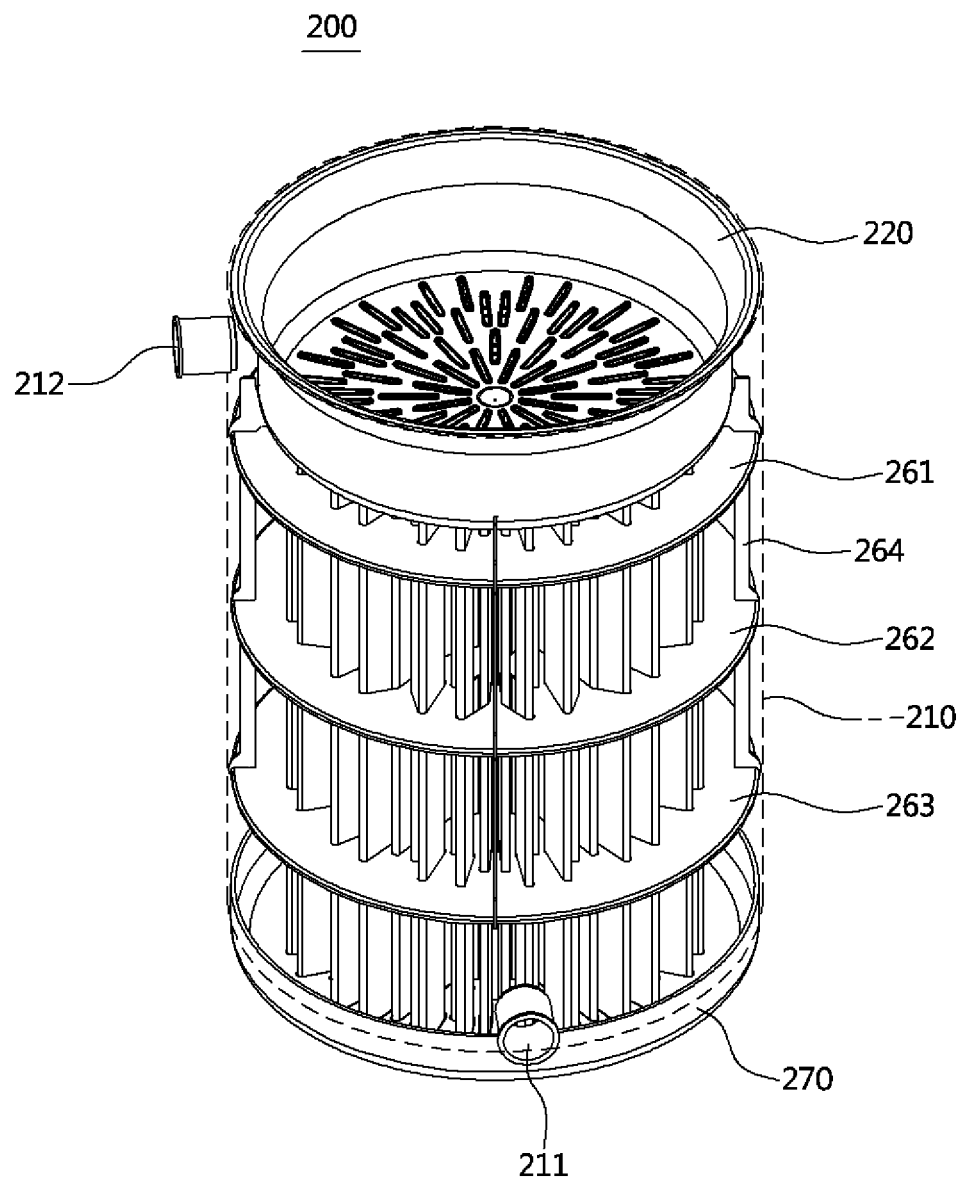

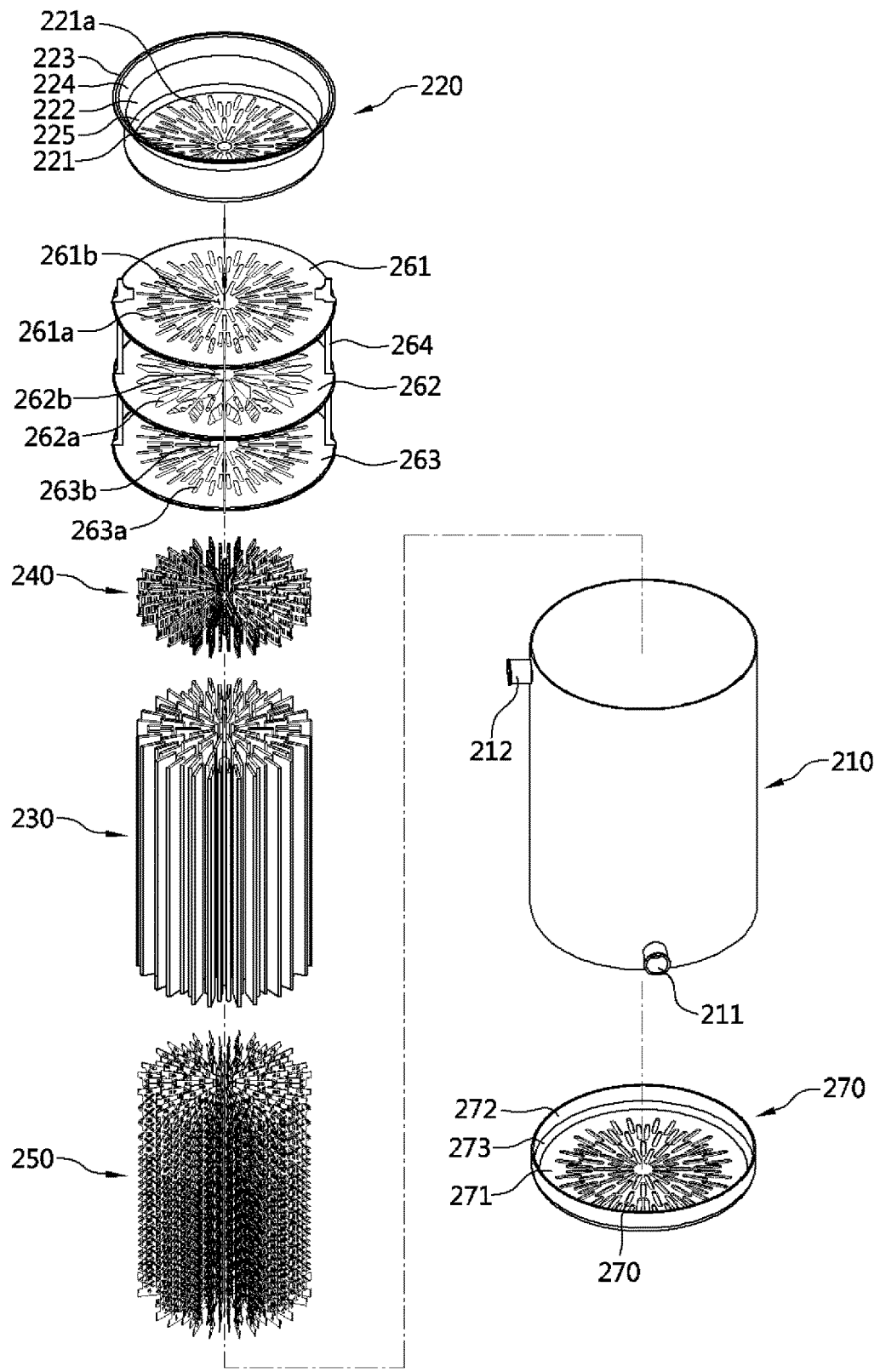
[FIG. 11]

【FIG. 12】
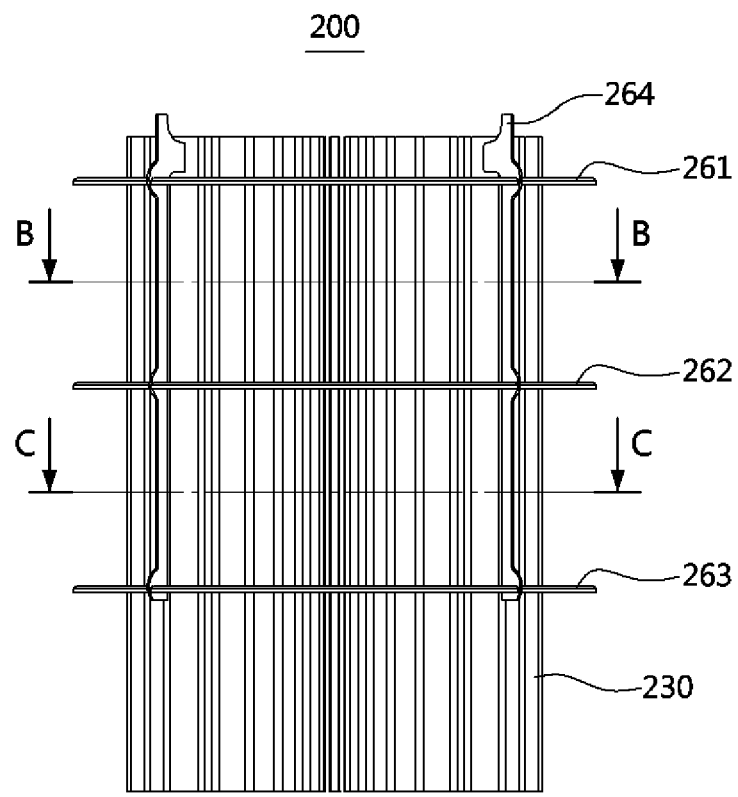
【FIG. 13A】
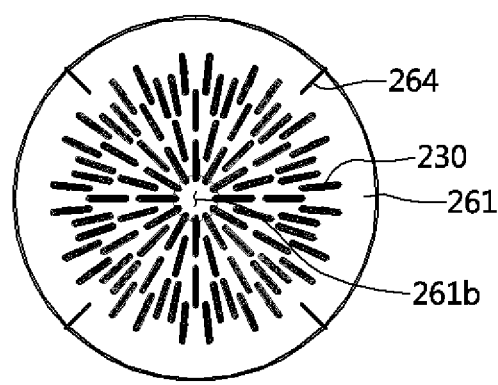

【FIG. 13B】
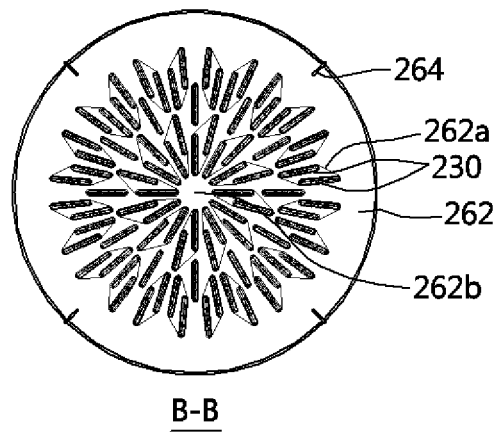
B-B
【FIG. 13C】
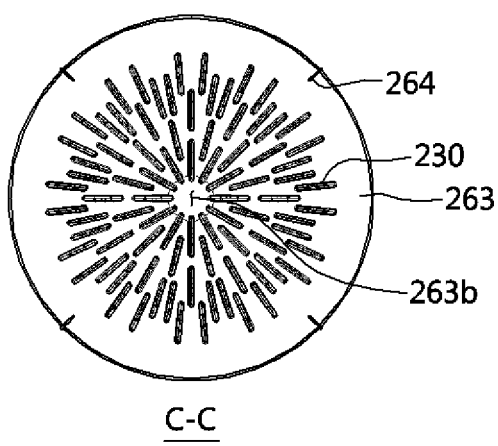
C-C

【FIG. 14】
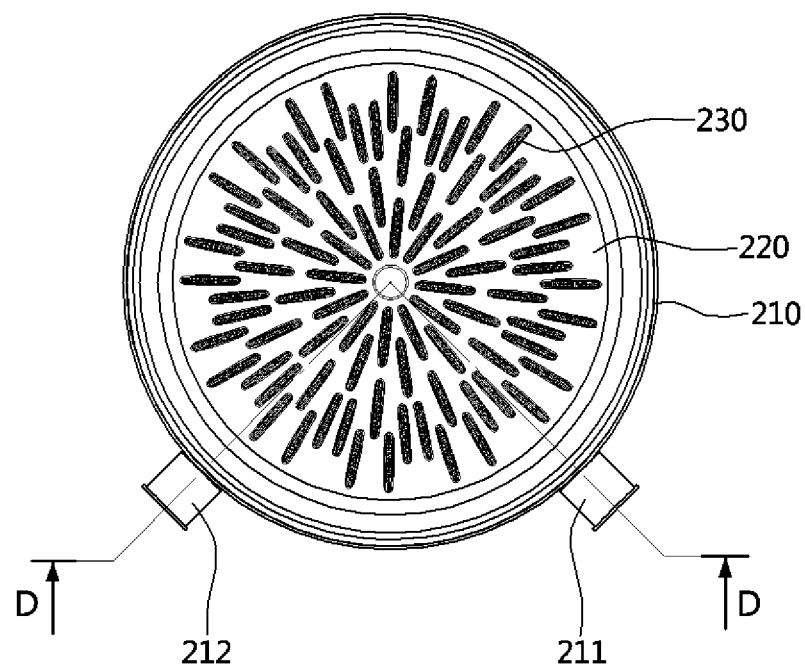

[FIG. 15]
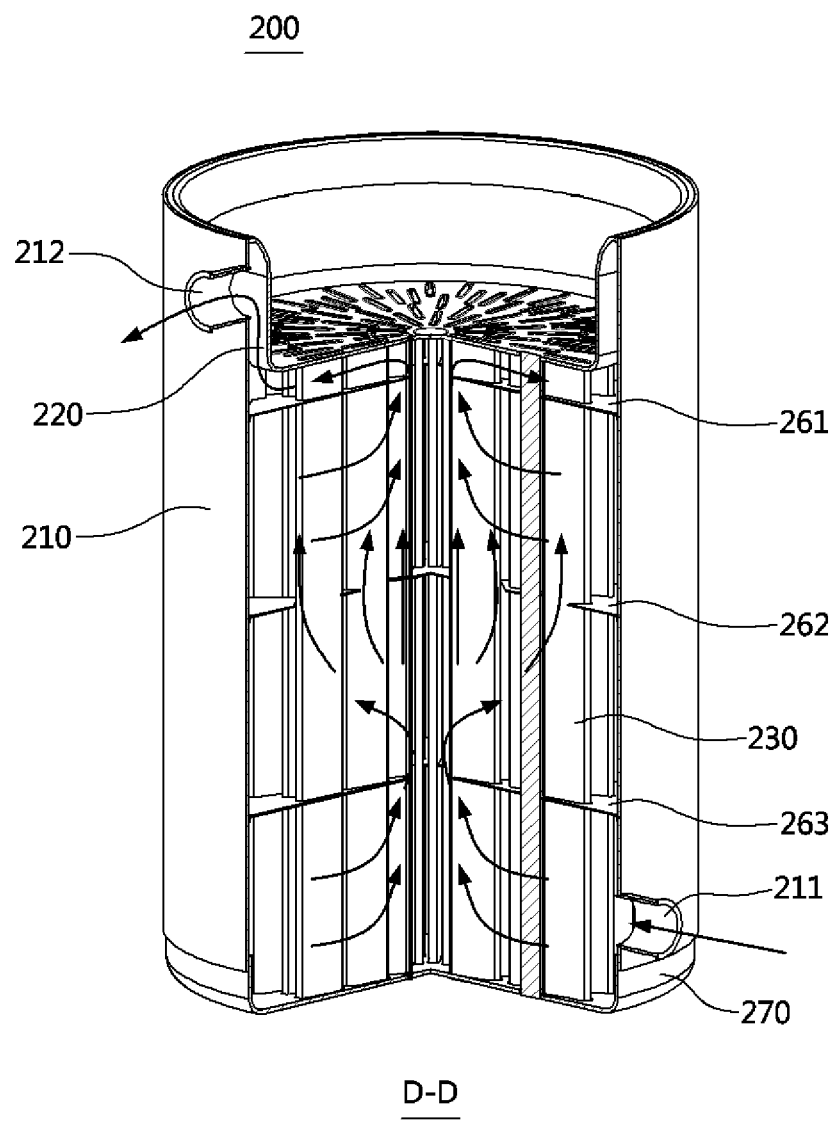
D-D

【FIG. 16】
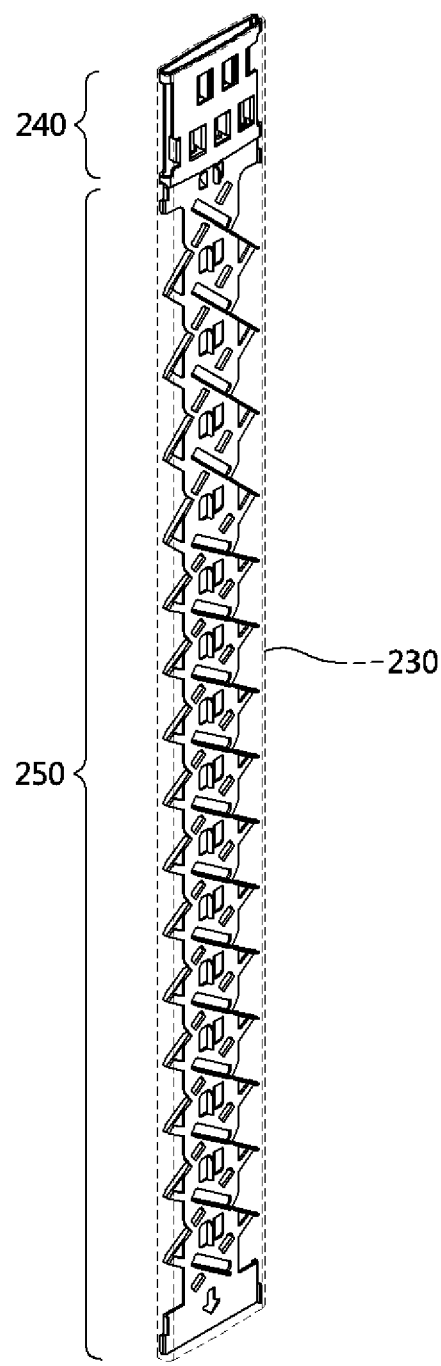

【FIG. 17】
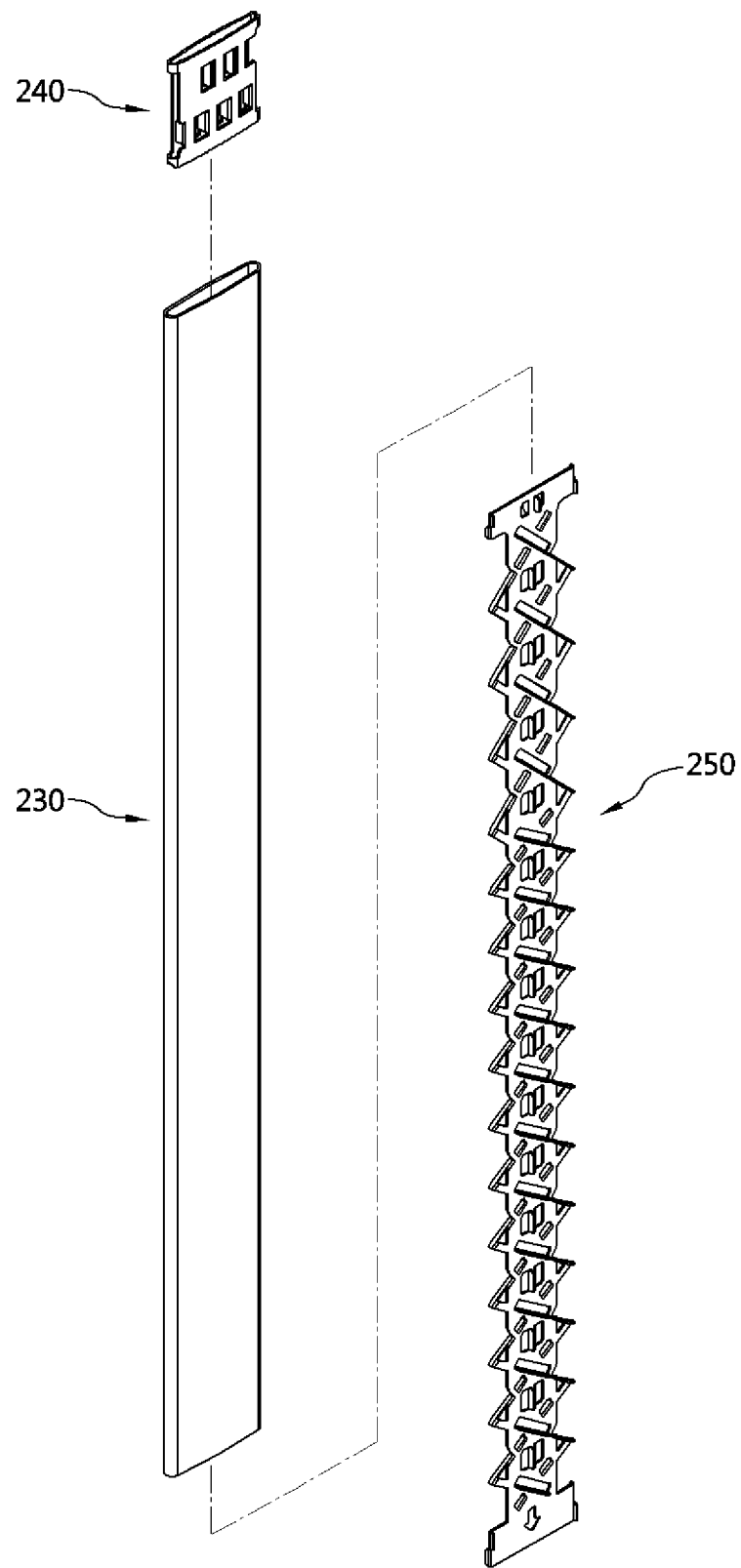

【FIG. 18】
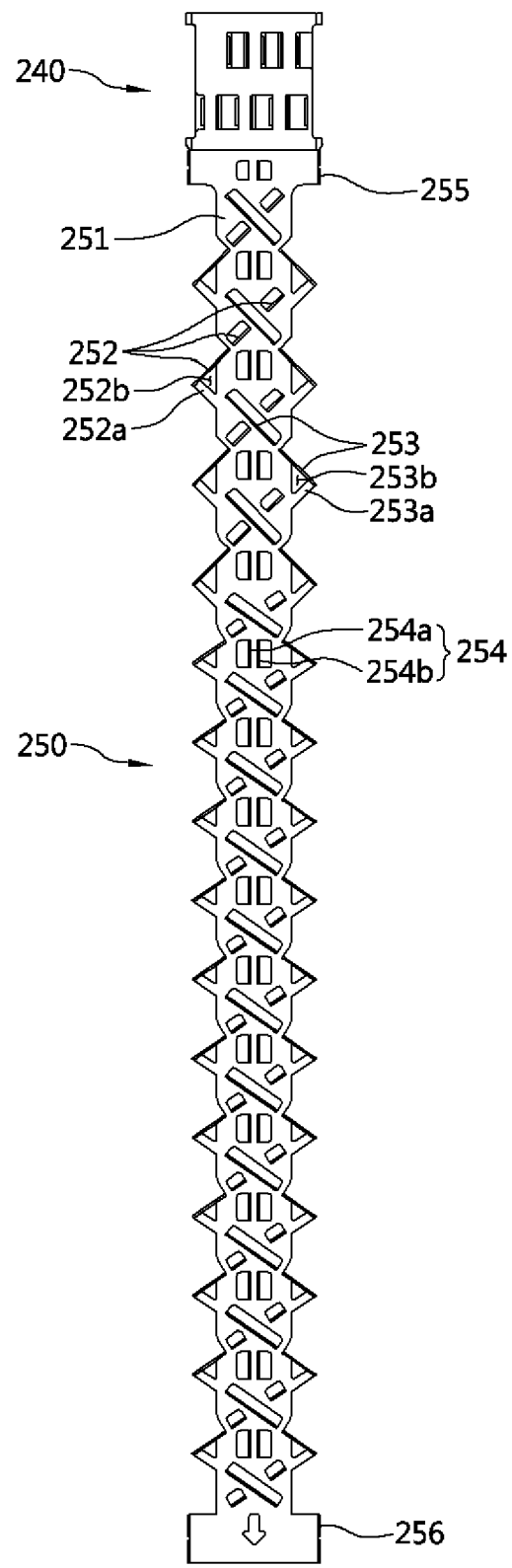

[FIG. 19]
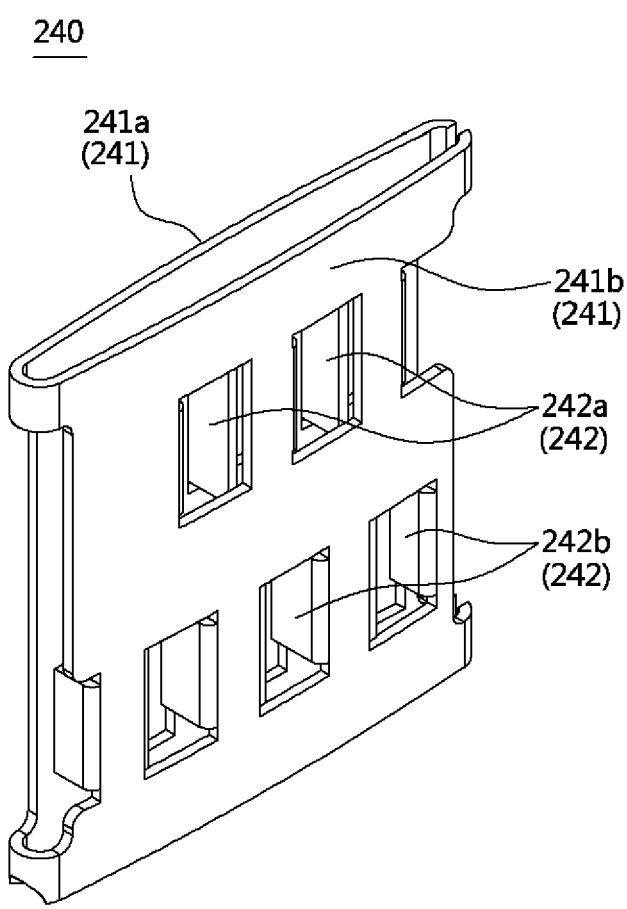

[FIG. 20]
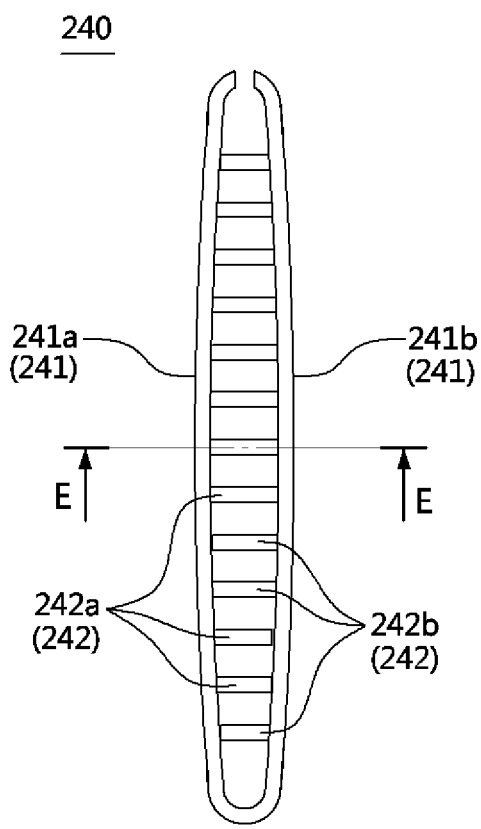

【FIG. 21A】
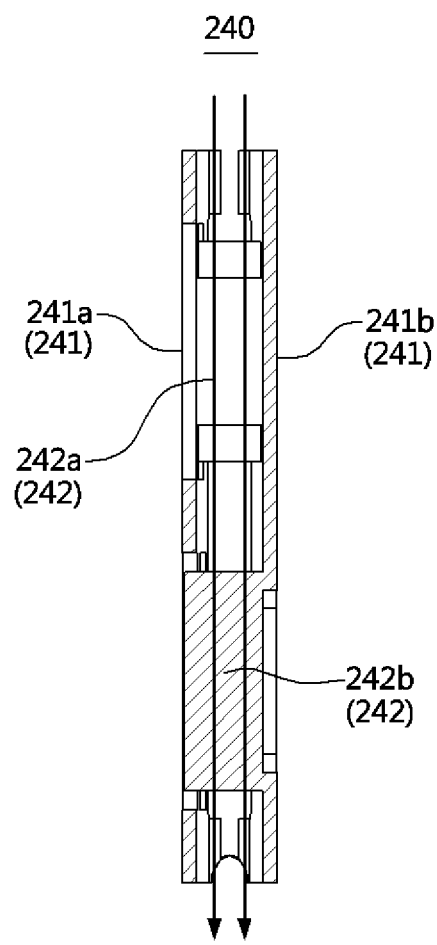

【FIG. 21B】
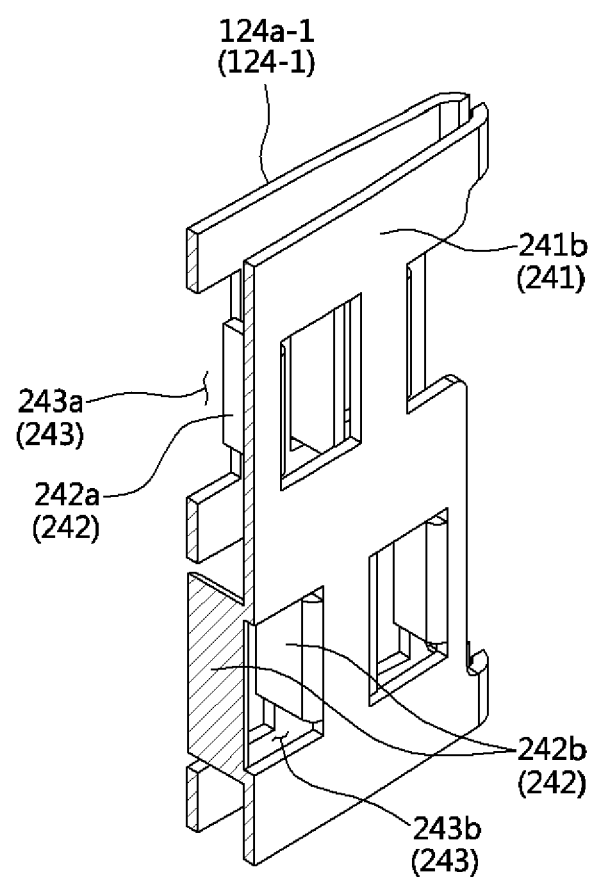

[FIG. 22]
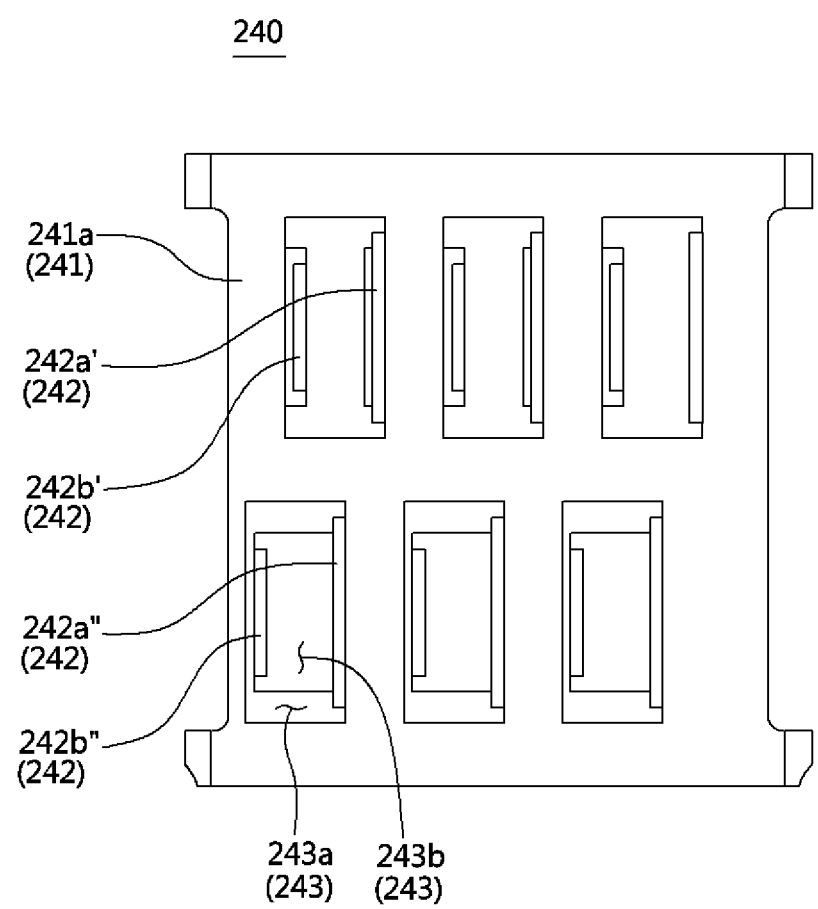

[FIG. 23]
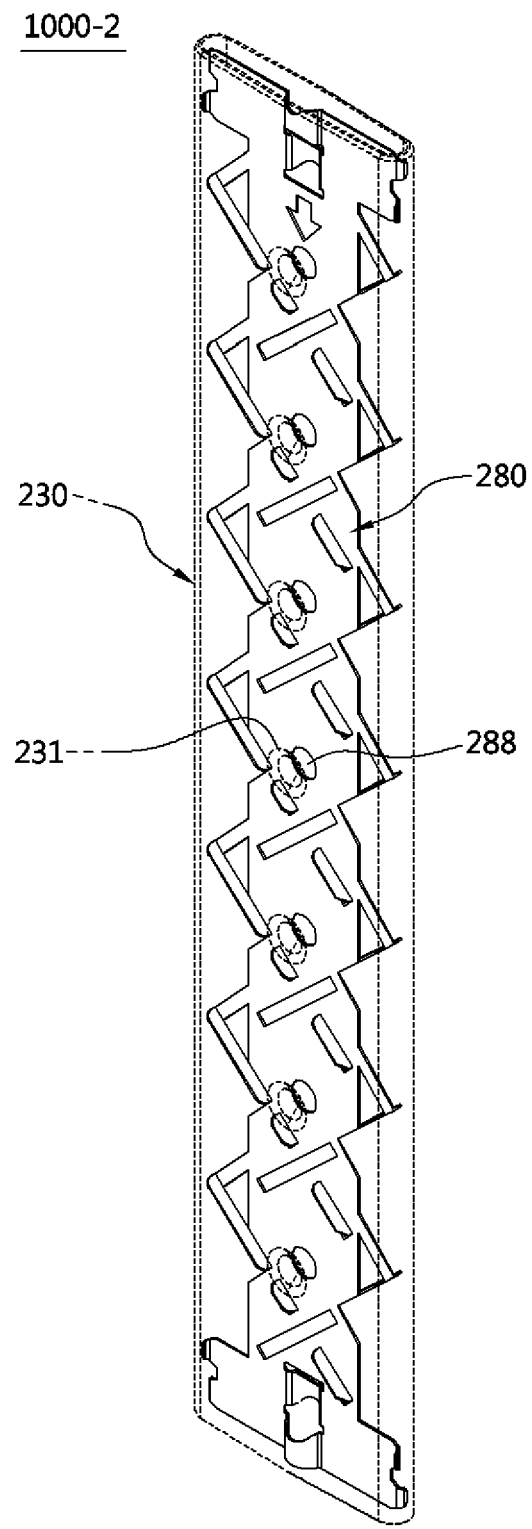

[FIG. 24]
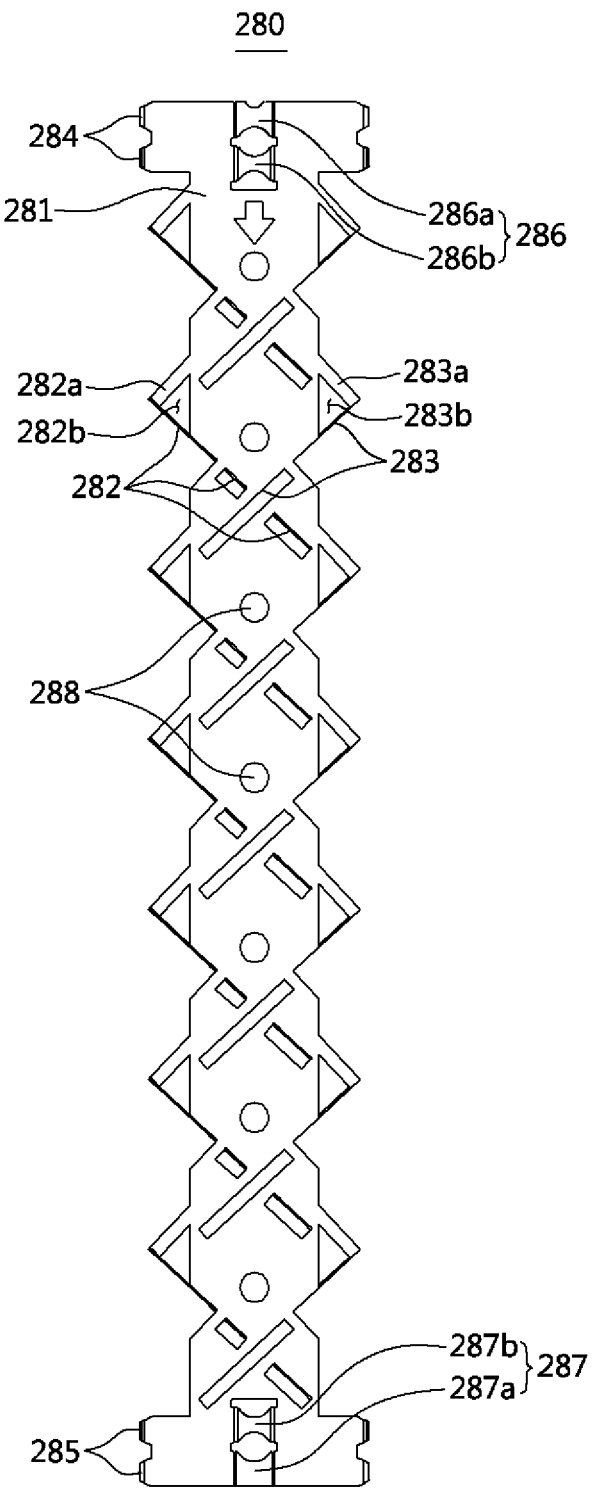

[FIG. 25]
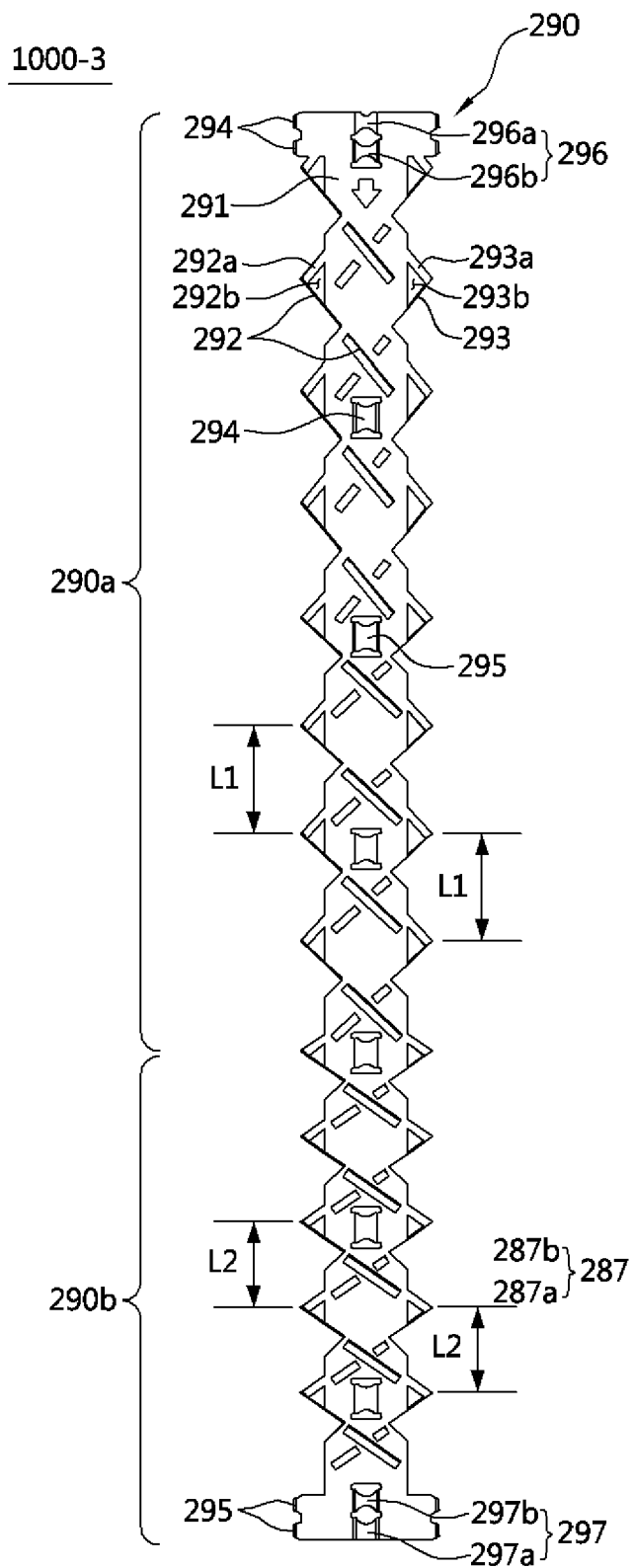

【FIG. 26A】
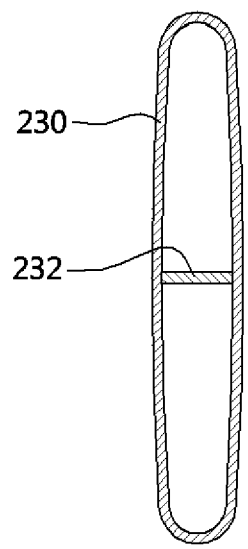
【FIG. 26B】
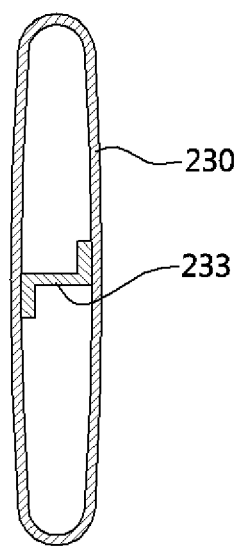

[FIG. 26C]
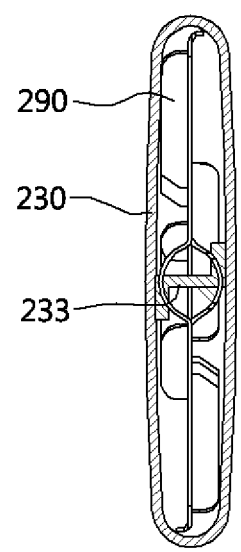
[FIG. 26D]
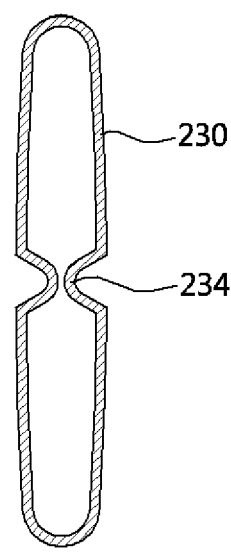

[FIG. 27]
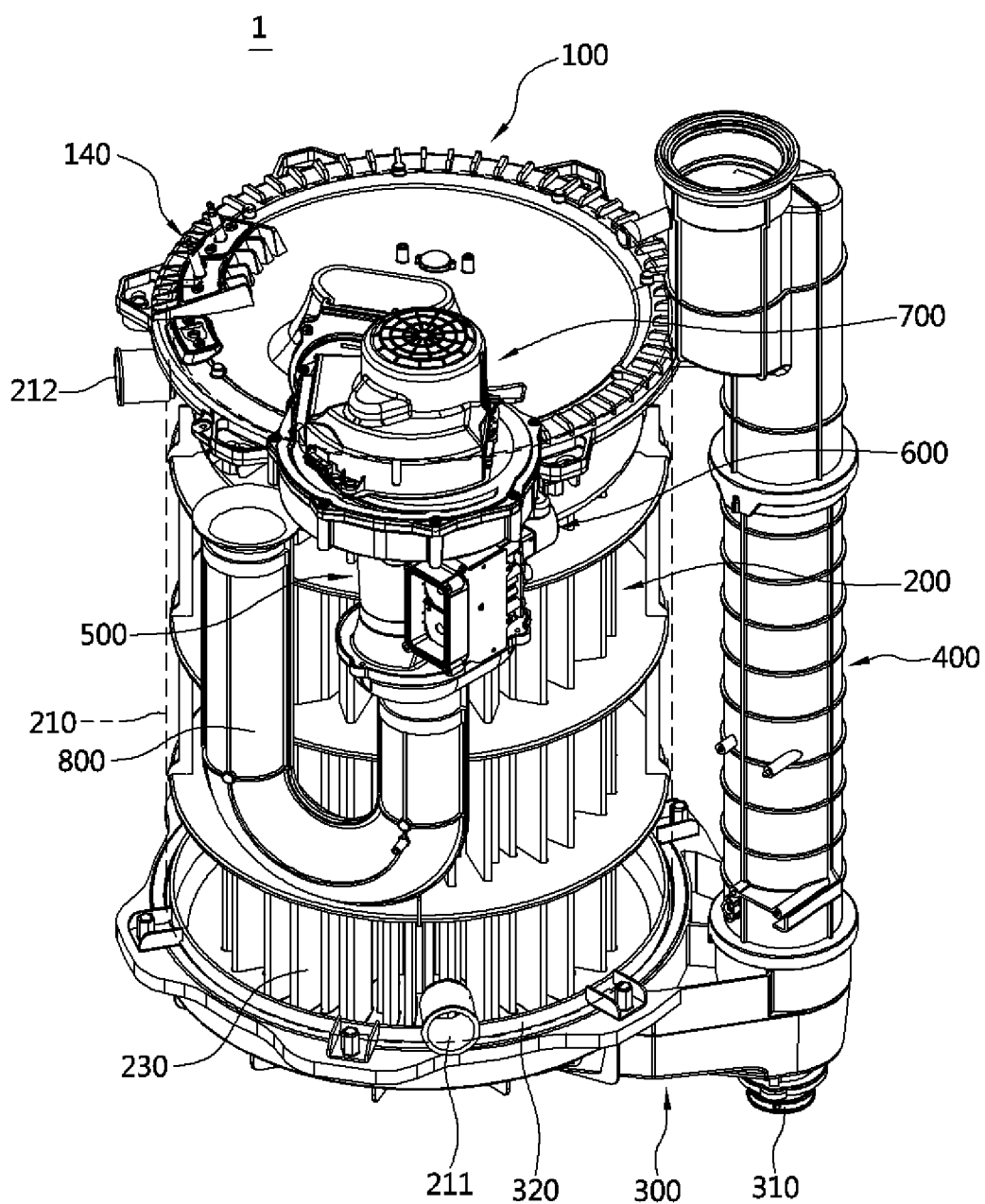

[FIG. 28]
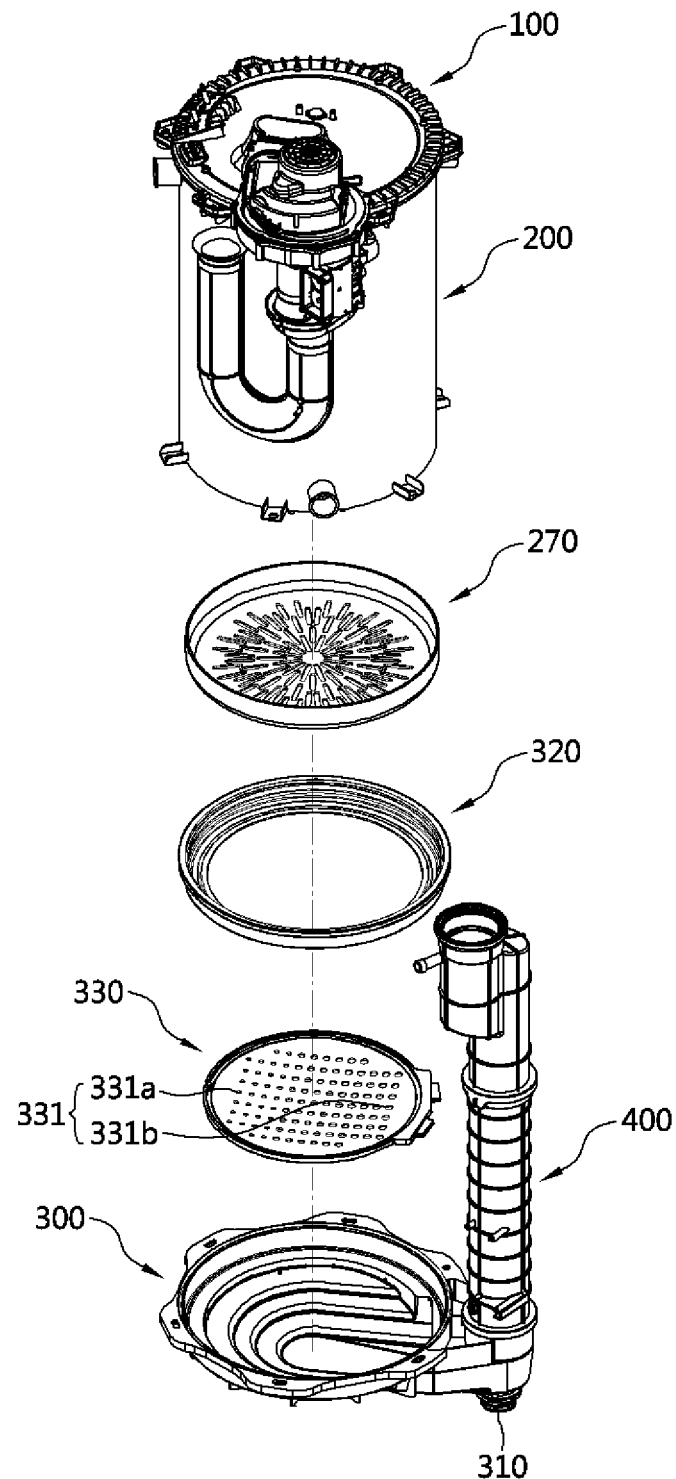

[FIG. 29A]
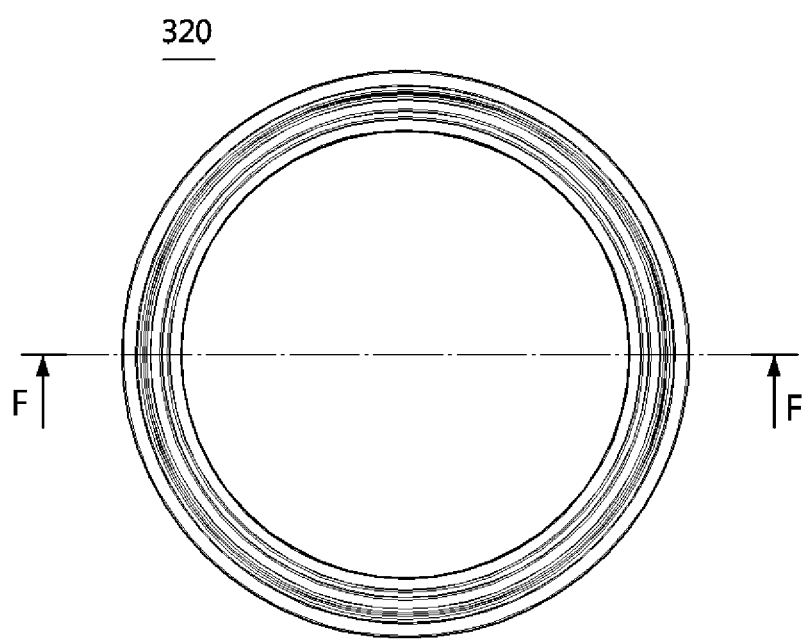

【FIG. 29B】
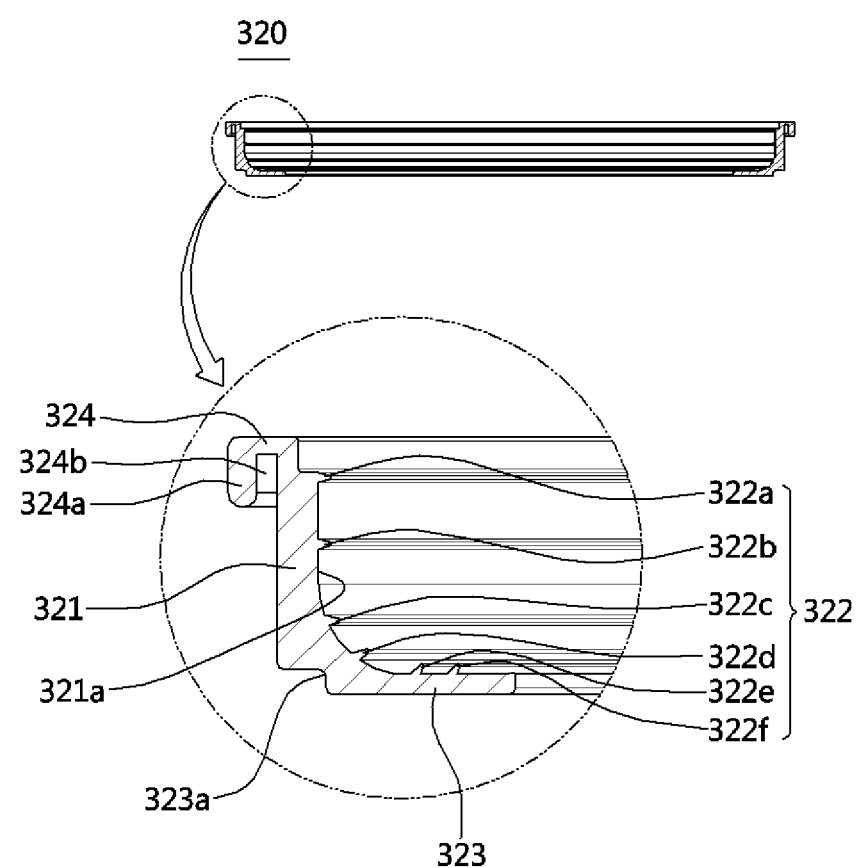

[FIG. 30]
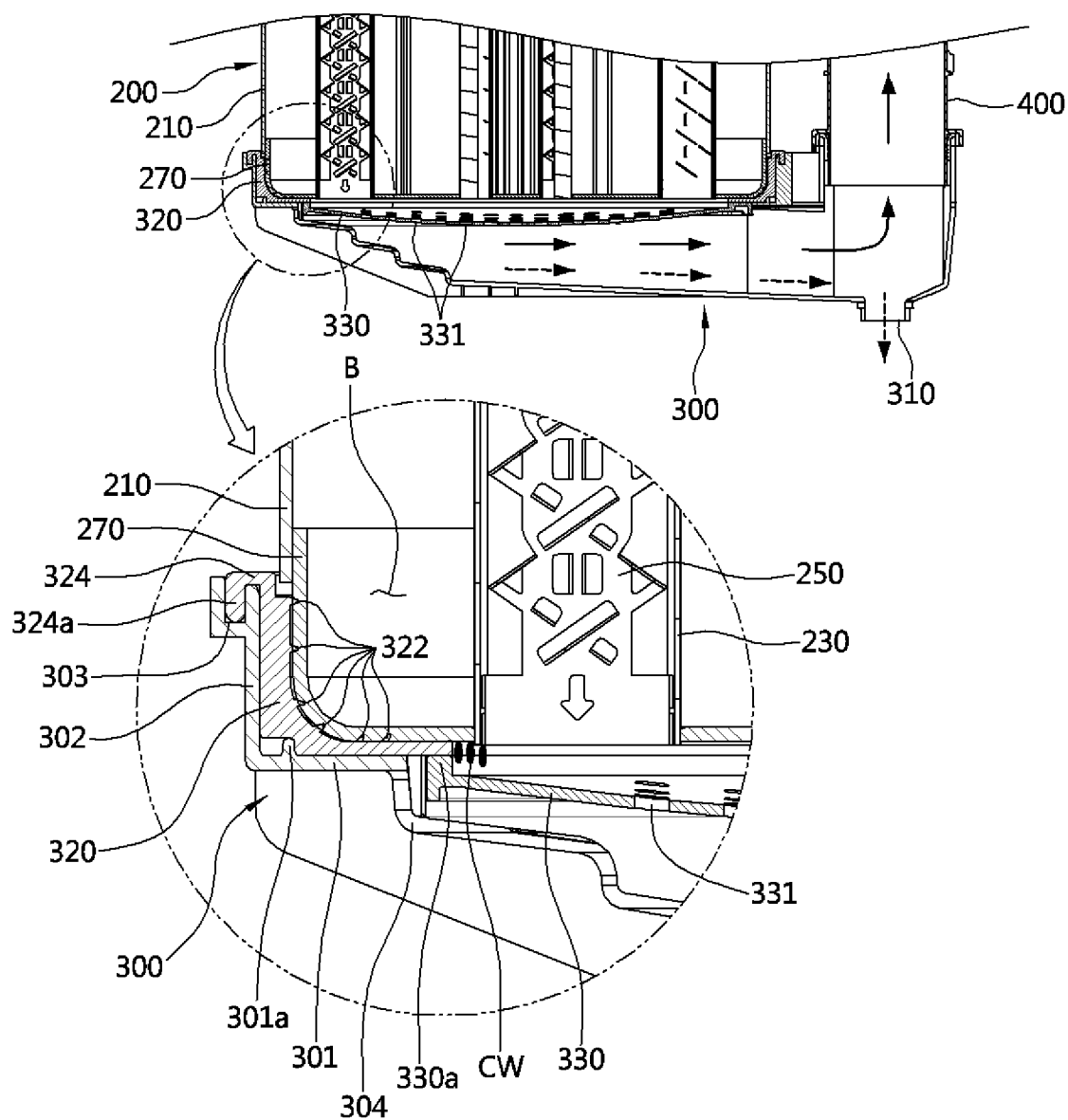

[FIG. 31]
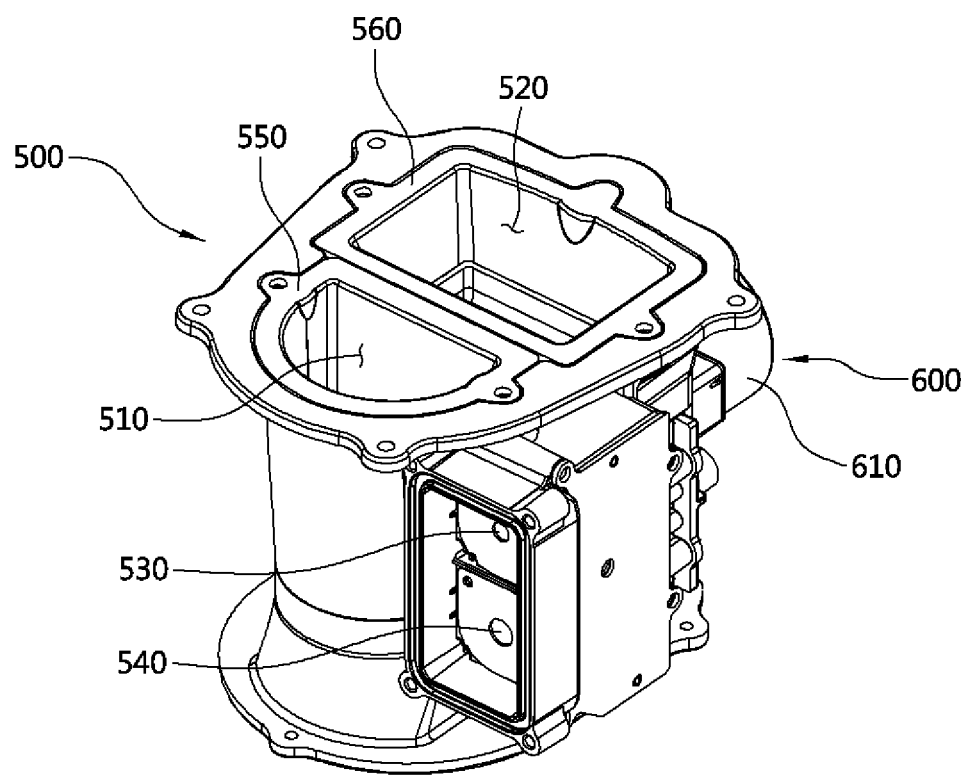

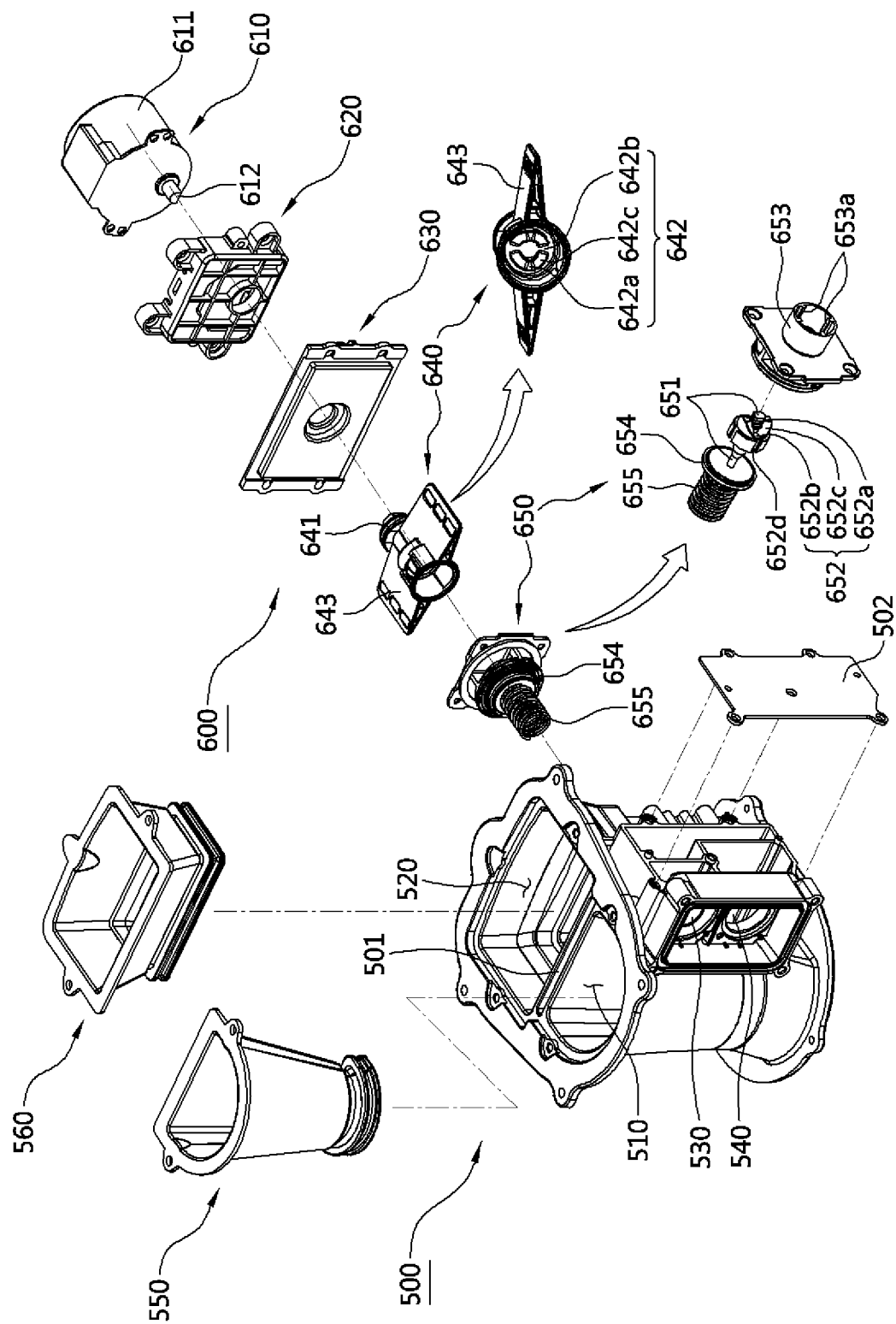
[FIG. 32]

【FIG. 33A】
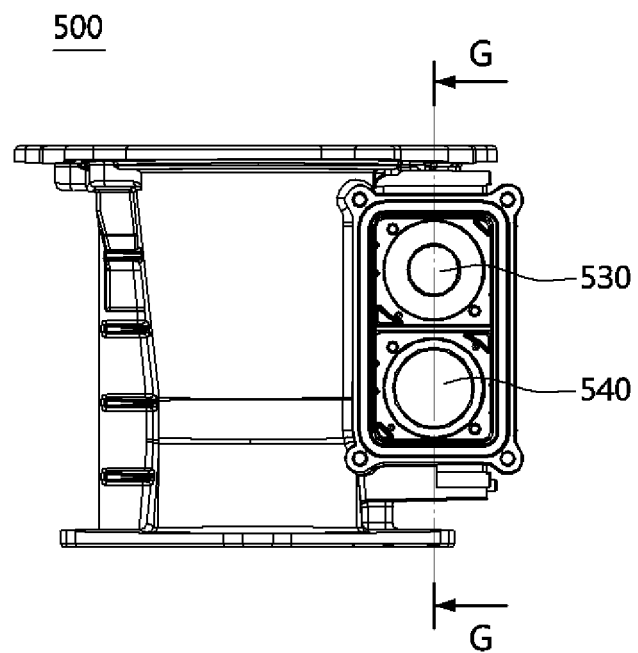
【FIG. 33B】
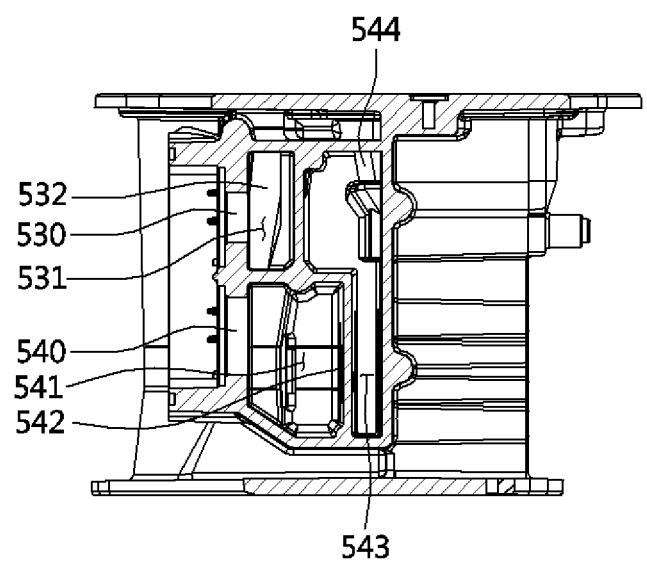

【FIG. 34A】
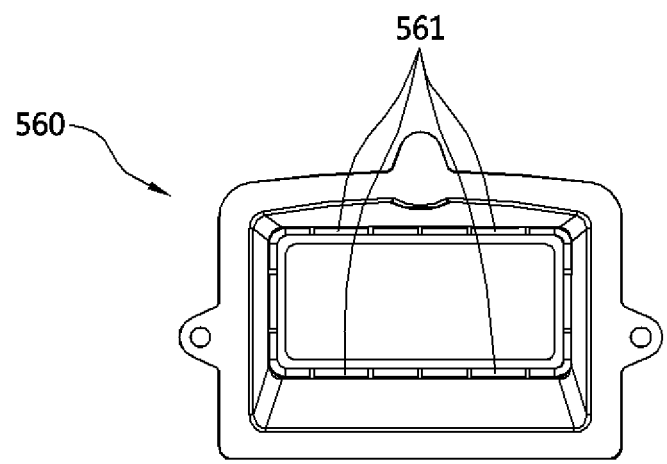
【FIG. 34B】
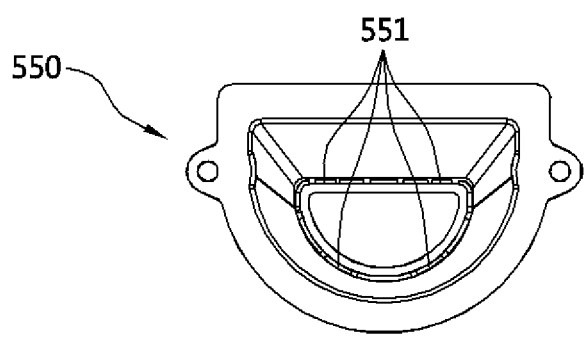

[FIG. 35]
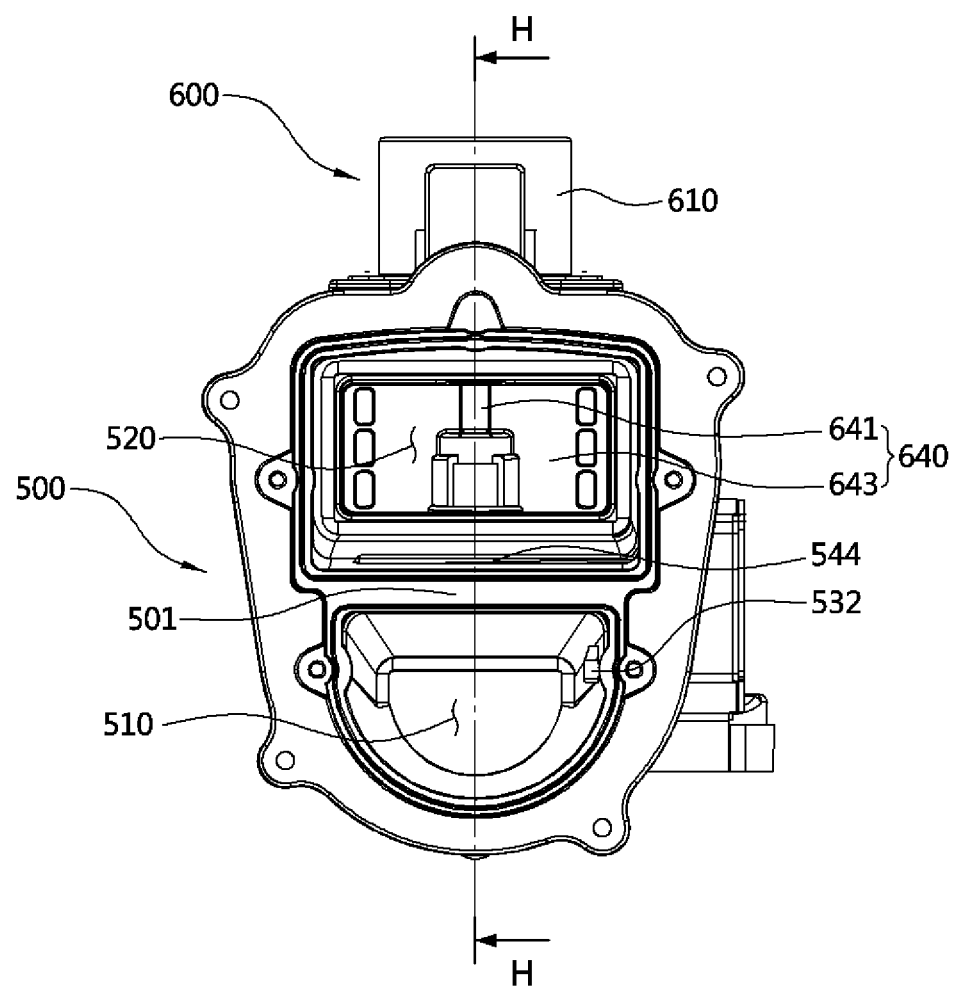

[FIG. 36]
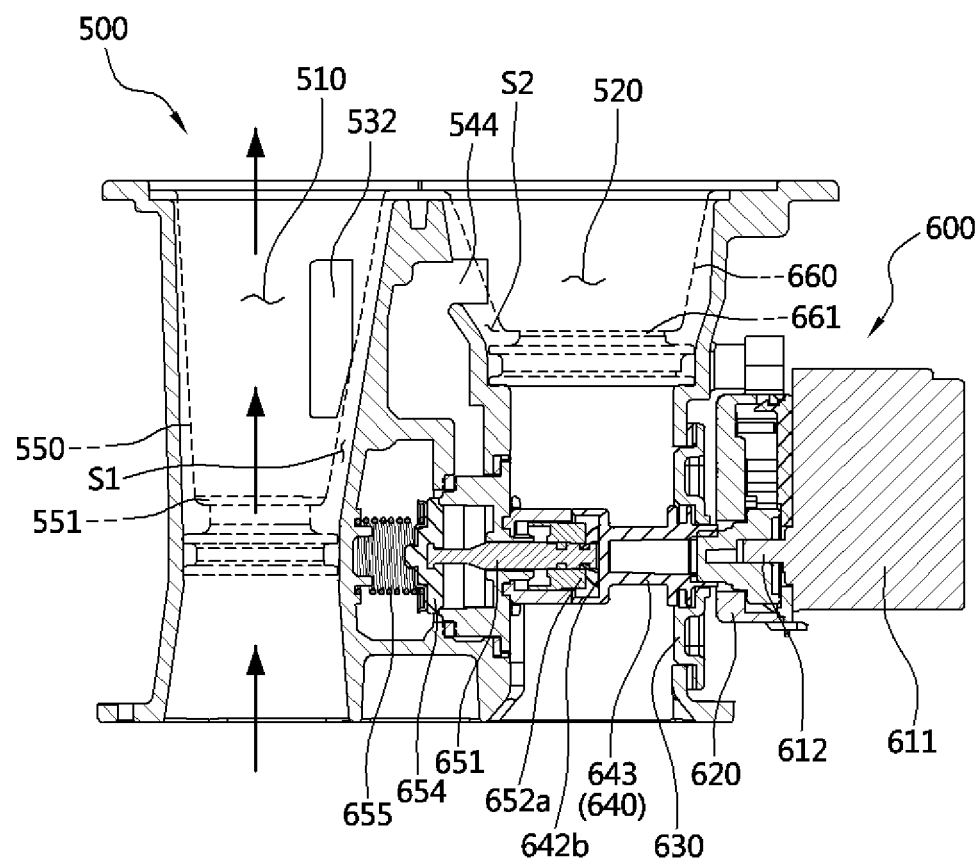

[FIG. 37]
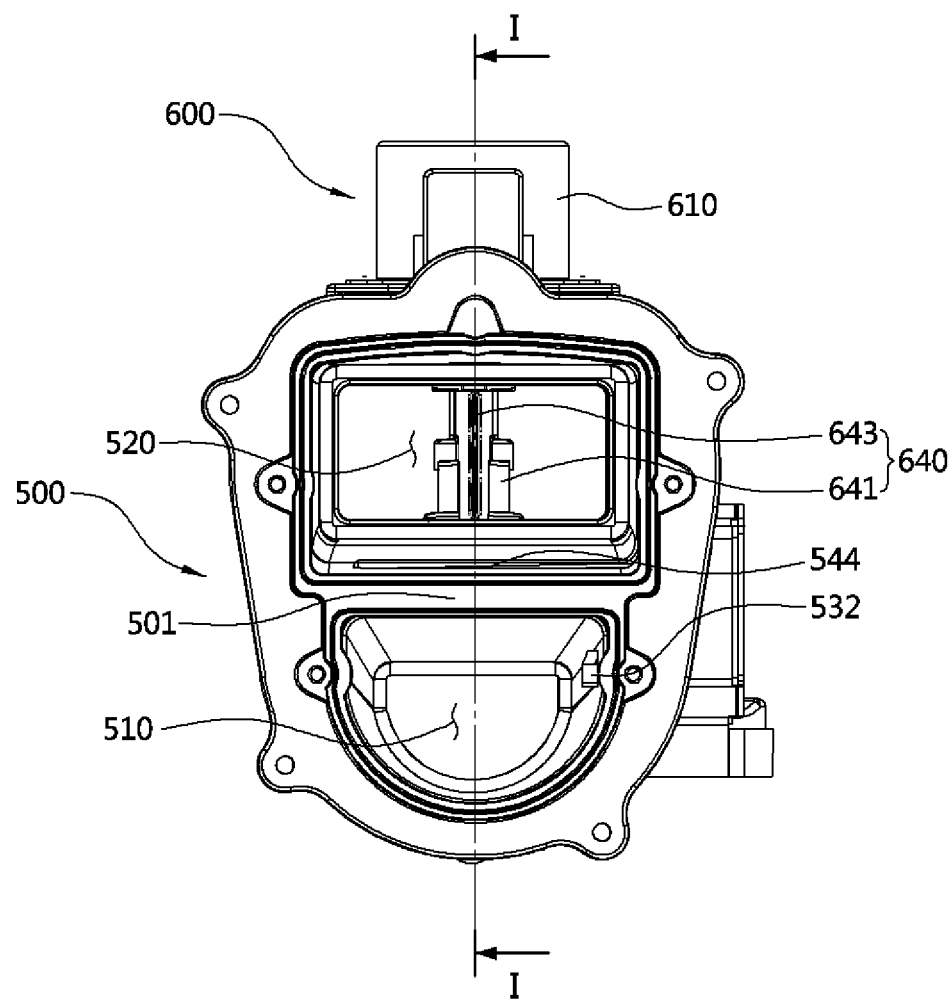

SMOKE TUBE BOILER

CROSS-REFERENCE TO RELATED APPLICATIONS

This application is a national stage of International Application No. PCT/KR2018/015662, filed Dec. 11, 2018, which claims the benefit of Korean Application No. 10-2017-0183573, filed Dec. 29, 2017, in the Korean Intellectual Property Office, the disclosure of which is incorporated herein by reference.

TECHNICAL FIELD

The present invention relates to a smoke tube boiler, and more particularly, to a smoke tube boiler capable of decreasing a height and improving heat exchange efficiency as compared with existing boilers and preventing deformation and damage even in an environment with high water pressure.

BACKGROUND ART

Generally, a boiler includes a heat exchanger in which a heat exchange occurs between a heat medium and combustion gas formed by combustion of fuel, thereby performing heating or supplying warm water using the heated heat medium. Such a boiler may include a heat exchange part having a heat exchanger disposed therein, a burner assembled to an upper portion of the heat exchange part, and a combustion chamber disposed between the burner and the heat exchanger and in which combustion occurs by combustion gas and air being supplied thereto.

FIG. 1 is a view schematically illustrating a configuration of a conventional smoke tube boiler.

The conventional smoke tube boiler includes an air blower (10) configured to supply combustion gas and air, a cylindrical burner (20) configured to burn a mixture of the combustion gas and the air, a combustion chamber (30) in which combustion of the mixture occurs due to the burner (20), a heat exchanger (40) in which a heat exchange occurs between a heat medium and combustion gas generated in the combustion chamber (30), a heat insulating material (50) configured to prevent heat generated in the combustion chamber (30) from being transferred to an upper side of a portion surrounding the cylindrical burner (20), and a firing rod (60) installed to pass through the heat insulating material (50) and configured to fire the mixture.

The heat exchanger (40) may include an outer shell (41), a plurality of tubes (42) disposed at an inner portion of the outer shell (41) and configured to have the combustion gas, which is generated in the combustion chamber (30), pass therethrough, and a water tank (43) disposed at an outer side of the tube (42) and configured to accommodate the heat medium.

According to the configuration of the conventional smoke tube boiler, due to including the cylindrical burner (20) which has a vertically long shape, the overall height of the boiler significantly increases, and it is not possible to manufacture the boiler in a compact size. Thus, there is a problem in that there are limitations in terms of installation space.

Also, in the conventional smoke tube boiler, in a case in which the firing rod (60) is installed to pass through a combustion chamber cover (12) which is provided between the air blower (10) and the cylindrical burner (20), the heat insulating material (50) is applied to prevent heat conduction to the firing rod.

However, the heat insulating material (50) may be cracked or broken into small pieces due to heat during combustion and cause problems such as blockage of the tube (42) which serves as a path for combustion gas in the heat exchanger (40). Also, there is a problem in that damage to the heat insulating material (50) is inevitable when a mix chamber (11), which includes the combustion chamber cover (12) and the cylindrical burner (20), is disassembled for maintenance and repair.

Meanwhile, when the firing rod (60) is installed at the heat exchanger (40) side, there are problems in that a manufacturing process becomes more complex due to additional processes and an increase in the number of components and there is a risk of heat medium leakage.

Related arts relating to the above-described structure in which a firing rod is assembled to a combustion chamber cover have been disclosed in Korean Patent Registration No. 10-0575187 and Korean Patent Registration No. 10-0581580.

Also, when a flat plate-shaped burner which has superior combustion performance as compared to the cylindrical burner (20) is applied, the flat plate-shaped burner is coupled to a mix chamber, a heat exchanger is coupled to one side of the mix chamber, and a combustion chamber is formed between the mix chamber and the heat exchanger. Here, when a firing rod assembly is coupled to the mix chamber so as to pass through one side portion thereof, a problem may occur in which mixture gas in a non-combusted state leaks to the outside through a gap between the mix chamber and the firing rod assembly. When the mixture gas in a non-combusted state (raw gas) leaks to the outside, there is a problem in that fatal danger may be caused to the human body.

When a sealing means is installed to prevent the leakage of mixture gas, because high-temperature heat of the combustion chamber is transferred to the sealing means, the sealing means may be easily damaged due to degradation, and thus there is a problem in that it is not easy to install the sealing means while preventing damage to the sealing means due to degradation.

Meanwhile, a smoke tube heat exchanger, which has been disclosed in European Unexamined Patent Application Publication No. EP2508834 and European Unexamined Patent Application Publication No. EP2437022, has a structure that includes a plurality of tubes, through which combustion gas generated due to combustion of a burner flows, and causes a heat medium to flow outside the tube so that a heat exchange occurs between the combustion gas and the heat medium.

A smoke tube having a flat shape and embossments applied thereto that is applied to a conventional heat exchanger has a disadvantage in that, despite being applicable to low-pressure boilers, it is not applicable to apparatuses used under a high-pressure environment, such as water heaters, commercial products relating thereto, and large-capacity boilers, due to the high possibility of deformation and damage to the smoke tube. In order to address the disadvantage, a thickness of a material applied to the smoke tube should be increased, and thus a material cost significantly increases.

Also, because a smoke tube structure is the same for a smoke tube upper portion, which is a path through which a high-temperature combustion gas having a large volume per unit mass flows, and a smoke tube lower portion, through which combustion gas that reached a low temperature after a heat exchange flows, there are disadvantages in that, when the number of embossments applied is increased to improve heat exchange efficiency, high flow resistance occurs at the smoke tube upper portion, and, when the number of embossments applied is decreased to address the occurrence of high flow resistance, heat exchange efficiency of a latent heat portion which has a condensing effect is significantly reduced.

Regarding a measure to increase the number of embossments on the latent heat portion, the shape and size of embossments make it impossible to manufacture more than a certain number of embossments, and even when the measure is applied, a manufacturing process becomes complicated, and thus a manufacturing cost increases.

Also, a smoke tube having a flat shape that is applied to a conventional heat exchanger has a disadvantage in that, despite being applicable to low-pressure boilers (which are used under a pressure of 6 kg/cm$^2$ or lower), it is not applicable to apparatuses used under a high-pressure environment, such as water heaters, commercial products relating thereto, and large-capacity boilers, due to the high possibility of deformation and damage to the smoke tube. In order to address the disadvantage, a thickness of a material applied to the smoke tube should be increased, and thus there are problems in that a heat exchange ability is lowered, manufacturability is lowered as the processing difficulty increases, and the cost is increased.

Meanwhile, in a smoke tube heat exchanger, an outer shell for providing a water tank configured to accommodate a heat medium is disposed outside a tube. An upper plate configured to form an upper surface of the water tank and support an upper end portion of the outer shell is coupled to an upper end portion of the tube, and a lower plate configured to form a bottom surface of the water tank and support a lower end portion of the outer shell is coupled to a lower end portion of the tube.

Regarding the smoke tube heat exchanger configured as described above, because the heat medium accommodated in the water tank causes a high water pressure to act on the lower plate, water pressure resistance is required to withstand the high water pressure so that durability of the lower plate is maintained.

However, the lower plate included in the conventional smoke tube heat exchanger has a problem in that durability is low due to not having a configuration capable of sufficiently distributing a water pressure.

Also, the conventional smoke tube boiler is formed of a structure in which a condensate tray is disposed below the lower plate and a sealing member configured to prevent leakage of condensate is disposed between an edge portion of the lower plate and an edge portion of the condensate tray, wherein the sealing member is configured to support a lower end portion of a side surface portion of the lower plate.

However, when a sealing member coupling structure is formed between the lower plate and the condensate tray as described above, there is a problem in that the condensate generated in the smoke tube heat exchanger stagnates between the sealing member and the lower end portion of the side surface portion of the lower plate and causes corrosion of the lower plate. Also, when the sealing member is configured in a generally known shape, there is a limitation in that it is not possible to reliably block the leakage of condensate. Related arts relating to the conventional condensate tray sealing structure has been disclosed in Korean Unexamined Patent Application Publication No. 10-2005-0036152 and the like.

Meanwhile, a turn-down ratio (TDR) of a burner is set for a gas combustion device such as a gas boiler or a gas water heater. "Turn-down ratio (TDR)" refers to a ratio of the maximum gas consumption to the minimum gas consumption in a gas combustion device in which the amount of gas is adjusted. For example, when the maximum gas consumption is 30,000 kcal/h and the minimum gas consumption is 6,000 kcal/h, the TDR is 5:1. The TDR is limited according to how low the minimum gas consumption can be adjusted to maintain a stable flame.

Regarding a gas combustion device, the higher the TDR, the greater the convenience in heating and heating water. That is, in the early stage of combustion, combustion is performed with maximum firepower in order to reach a target heating temperature within a short time, but, when the target heating temperature is almost reached, combustion is performed by gradually reducing the amount of gas supplied to the burner. In this case, when the minimum gas consumption is high, and thus the TDR is low, it is difficult to control by reducing the amount of gas to reduce the output of the burner.

Particularly, when the burner is operated in a range in which the load of heating and heating water is small, the combustion device is turned on and off frequently, the combustion state becomes unstable, and thus variation in temperature control increases and durability of the device is decreased. Therefore, methods to improve a TDR of a burner applied to a combustion device have been proposed.

As a related art relating thereto, Korean Patent Registration No. 10-0805630 discloses a combustion device of a gas boiler, the combustion device including an air blower configured to supply air required for combustion, a proportional control valve configured to regulate a gas supply flow rate, nozzle parts which are connected to the proportional control valve, configured to receive gas supplied thereto by opening and closing of an auxiliary valve, and formed by a plurality of nozzles connected in parallel, a mixing chamber configured to mix air supplied from the air blower and gas that passed through the nozzle part and supply the mixture to a surface of a burner, and a control part configured to control a number of rotations of the air blower according to opening and closing of the proportional control valve and the auxiliary valve and supply only the amount of air required for combustion.

According to such a configuration, since the nozzle parts to which the gas is supplied are arranged in parallel in multiple stages, and opening and closing of each nozzle part are controlled corresponding to output of the burner such that the TDR is improved, there is an advantage in that the combustion stability may be improved in a low output range.

However, regarding the conventional combustion devices including the related arts, the relevance between the air flow and gas flow directions the and combustion efficiency has not been taken into consideration in mixing air and gas inside a mixing chamber (pre-mixing chamber). In the conventional combustion devices, air and gas are mixed inside the pre-mixing chamber while an air flow direction and a gas ejection direction are different. When the air and gas are mixed while the air flow direction and the gas ejection direction are different, ejection of the gas may be affected by flow of the air, and a desired air/gas ratio may not be obtained. Thus, there is a problem in that combustion becomes unstable and combustion efficiency is lowered.

In addition, since the pre-mixing chamber of the conventional combustion devices is formed of a single Venturi structure and thus the TDR is limited to 5:1 or lower, there is a problem in that, during combustion in a low output range, the burner is turned on and off frequently, the combustion efficiency is lowered, and performance of the combustion device is degraded.

DISCLOSURE

Technical Problem

The present invention is directed to providing a smoke tube boiler capable of decreasing a height and improving heat exchange efficiency as compared with existing boilers, preventing deformation and damage even in an environment with high water pressure, preventing leakage and formation of condensate, allowing smooth discharge of the condensate, and improving a turn-down ratio (TDR) of a burner so that a stable combustion state is implemented even in a low-load range.

Technical Solution

One aspect of the present invention provides a smoke tube boiler including: a mix chamber which includes a mixing space in which combustion gas and air are mixed, a mix chamber body having a flat shape, and a flat plate-shaped burner disposed in a horizontal direction above a combustion chamber; and a heat exchanger which includes an outer shell forming an outer wall of a water tank into and from which a heat medium is introduced and discharged and which accommodates the heat medium, an upper plate having an end plate structure that is coupled to the outer shell and configured to form the combustion chamber, a plurality of tubes formed in a flat shape that are configured to allow combustion gas generated in the combustion chamber to flow therein and cause a heat exchange to occur between the combustion gas and the heat medium flowing outside the tubes, turbulators coupled to an inner side of the tube and configured to induce occurrence of a turbulent flow in the flow of the combustion gas, multi-stage barriers disposed between the outer shell and the tube and configured to induce a heat medium flow direction to be alternately changed between a radially inward direction and a radially outward direction, and a lower plate having an end plate structure that is configured to support a lower end portion of the tube.

The smoke tube boiler may include a condensate tray configured to collect condensate generated at the lower plate, guide the collected condensate toward a condensate outlet formed at one side, and guide the combustion gas that passed through the tube toward an exhaust duct which is connected to an upper side of the condensate outlet and disposed at one side of the outer shell.

The smoke tube boiler may include a firing rod assembly assembled to pass through one side portion of the mix chamber and configured to extend across an upper portion of the combustion chamber toward a lower side of the flat plate-shaped burner, and a sealing means configured to block leakage of mixed gas of the mixing space and exhaust gas of the combustion chamber to the outside through a gap between the mix chamber and the firing rod assembly.

A mix chamber flange and a burner flange may be disposed to come in contact with each other at the one side portion of the mix chamber and seal the mixing space, and the firing rod assembly may be assembled to pass through the mix chamber flange and the burner flange at a position spaced apart from the mixing space.

The sealing means may include a first sealing member disposed at a portion where the mix chamber flange and the burner flange come in contact with each other and configured to prevent leakage of the mixed gas. The first sealing member may be formed of a graphite material.

The firing rod assembly may include a firing rod and a flame sensing rod. A firing rod coupling plate to which the firing rod is coupled by passing therethrough and a flame sensing rod coupling plate to which the flame sensing rod is coupled by passing therethrough may be disposed at an upper portion of the one side portion of the mix chamber. The sealing means may include a second sealing member disposed between the upper portion of the one side portion of the mix chamber and the firing rod coupling plate and a third sealing member disposed between the upper portion of the one side portion of the mix chamber and the flame sensing rod coupling plate. The second sealing member and the third sealing member may be formed of a rubber material.

A plurality of close contact protrusions may be formed at predetermined intervals so as to protrude from an outer side surface of the second sealing member and an outer side surface of the third sealing member.

A space between a lower surface of the mix chamber body and an upper surface of the flat plate-shaped burner may be formed in a flat disc shape.

The smoke tube boiler may include a firing rod assembly assembled to pass through one side portion of the mix chamber and configured to extend across an upper portion of the combustion chamber toward a lower side of the flat plate-shaped burner, and a cooling means configured to block transfer of heat to a sealing means configured to seal a gap between the mix chamber and the firing rod assembly so that combustion heat generated in the combustion chamber does not leak through the gap.

The cooling means may include an air-cooled cooling means and a water-cooled cooling means.

A mix chamber flange and a burner flange may be disposed to come in contact with each other at the one side portion of the mix chamber and seal the mixing space, the firing rod assembly may be assembled to pass through the mix chamber flange and the burner flange, and the air-cooled cooling means may allow the mix chamber flange and the burner flange to be cooled by the mixed gas introduced into the mixing space.

A mix chamber flange and a burner flange may be disposed to come in contact with each other at the one side portion of the mix chamber and seal the mixing space, the firing rod assembly may be assembled to pass through the mix chamber flange and the burner flange, and the water-cooled cooling means may be disposed to allow an upper plate flange, which is formed at an upper end of the upper plate that comes in contact with the heat medium of the water tank, to come in surface contact with the burner flange so that the burner flange is cooled.

A plurality of heat dissipating fins may be disposed along a circumference of the firing rod assembly at the one side portion of the mix chamber to which the firing rod assembly is assembled.

A round portion configured to provide support against the water pressure of the heat medium stored in the water tank may be formed at an upper portion of the upper plate.

The upper plate flange may be formed to protrude outward from an upper end of the round portion, and a ratio between an outer diameter of the upper plate flange and an inner diameter of a lower end of the round portion may be 20% or less.

A height between a lower surface of the flat plate-shaped burner that is inserted into the upper plate and a bottom surface of the upper plate may be set so that an end of a flame generated in the flat plate-shaped burner is spaced a predetermined distance apart from the bottom surface of the upper plate. Preferably, the height may be set to be around 80 mm.

An electrode rod assembly may be disposed at one side of a mixture inlet through which a mixture is supplied to the mix chamber.

The electrode rod assembly may be disposed at a side opposite the mixture inlet through which the mixture is supplied to the mix chamber.

The turbulators may include an upper turbulator coupled to an upper inner side of the tube in the vicinity of the combustion chamber so as to come in surface contact with the tube so that thermal conductivity is increased and configured to induce occurrence of a turbulent flow in the flow of the combustion gas, and a lower turbulator coupled to the inner side of the tube below the upper turbulator and configured to induce occurrence of a turbulent flow in the flow of the combustion gas.

The upper turbulator may include a first portion including a first tube contact surface which is formed in a shape corresponding to one side portion of the tube and comes in surface contact with an inner side surface of the one side portion of the tube and a second portion including a second tube contact surface which is formed in a shape corresponding to the other side portion of the tube and comes in surface contact with an inner side surface of the other side portion of the tube.

The upper turbulator may include a first pressure support part configured to protrude so that a portion of a first cut-out portion, which is cut out from the first tube contact surface, is bent toward the second tube contact surface and a second pressure support part configured to protrude so that a portion of a second cut-out portion, which is cut out from the second tube contact surface, is bent toward the first tube contact surface. A protruding end portion of the first pressure support part may come in contact with the second tube contact surface, and a protruding end portion of the second pressure support part may pass through the first cut-out portion and come in contact with an inner side surface of the tube.

The first pressure support part and the second pressure support part may be provided as a plurality of first pressure support parts and a plurality of second pressure support parts which are spaced apart in a longitudinal direction and a vertical direction. The first pressure support part disposed at an upper side and the first pressure support part disposed at a lower side may be disposed at positions not overlapping each other in the vertical direction, and the second pressure support part disposed at the upper side and the second pressure support part disposed at the lower side may be disposed at positions not overlapping each other in the vertical direction.

The first pressure support part and the second pressure support part may be formed in the shape of a plate, and both side surfaces thereof having a large area may be disposed parallel to a combustion gas flow direction.

The turbulator may include a flat surface portion disposed in a longitudinal direction of the tube so as to divide an inner space of the tube into two sides and a plurality of first guide pieces and second guide pieces formed at both side surfaces of the flat surface portion so as to be spaced apart in the longitudinal direction and alternately protrude obliquely.

The first guide piece may be disposed at one side surface of the flat surface portion so as to be inclined toward one side, the second guide piece may be disposed at the other side surface of the flat surface portion so as to be inclined toward the other side, and a heat medium introduced into the first guide piece and a heat medium introduced into the second guide piece may be sequentially passed over to the second guide piece and the first guide piece, which are disposed to be adjacent at the opposite side surfaces of the flat surface portion, so as to alternately flow in both side spaces of the flat surface portion.

A heat medium inlet end of the first guide piece may be connected to one side end of the flat surface portion by a first connecting piece, and a first communication hole through which fluid communication occurs in both side spaces of the flat surface portion may be provided between the one side end of the flat surface portion and the first connecting piece and the first guide piece. A heat medium inlet end of the second guide piece may be connected to the other side end of the flat surface portion by a second connecting piece, and a second communication hole through which fluid communication occurs in both side spaces of the flat surface portion may be provided between the other side end of the flat surface portion and the second connecting piece and the second guide piece.

The first guide piece and the second guide piece may have portions cut out from the flat surface portion so as to be bent toward both sides of the flat surface portion, and fluid communication may occur in both side spaces of the flat surface portion through the cut-out portions of the first guide piece and the second guide piece.

The turbulators may include an upper turbulator disposed at a combustion gas inlet side and a lower turbulator disposed at a combustion gas outlet side. An interval at which the plurality of first guide pieces and second guide pieces formed in the lower turbulator are vertically spaced apart may be smaller than an interval at which the plurality of first guide pieces and second guide pieces formed in the upper turbulator are vertically spaced apart.

The turbulator may include an upper turbulator disposed at a combustion gas inlet side and a lower turbulator disposed at a combustion gas outlet side. A flow path between the lower turbulator and the inner side surface of the tube may have a smaller area than a flow path between the upper turbulator and the inner side surface of the tube.

An area coming in contact with the heat medium inside the tube may be larger in the lower turbulator than in the upper turbulator.

The turbulators may include support parts which are vertically spaced apart and protrude forward and rearward so as to come in contact with both side surfaces of the tube. The support parts may be disposed to be vertically spaced apart.

The smoke tube boiler may further include a pressure support part formed at an inner side of the tube and configured to provide support against an external pressure that acts on both opposite side surfaces of the tube.

The pressure support part may include a support configured to protrude outward from both side surfaces of the turbulator and come in contact with the opposite inner side surfaces of the tube.

The support may be formed by portions being cut out from a surface of the turbulator and bent toward both sides.

The plurality of tubes may be installed in the vertical direction so that the combustion gas generated in the combustion chamber flows downward and may be spaced apart in a circumferential direction and disposed radially.

The plurality of tubes may be inserted into the multi-stage barriers and supported, and the multi-stage barriers may be supported by the support.

The multi-stage barriers may include an upper barrier, a middle barrier, and a lower barrier which are in the shape of a plate, an opening may be formed in central portions of the upper barrier and the lower barrier in order to allow flow of the heat medium, and a tube insertion hole may be formed in the middle barrier while a clearance is formed between the tube insertion hole and an outer side surface of the tube so that the heat medium flows through the tube insertion hole.

The lower plate may include a horizontal portion configured to support a lower end portion of the tube and form a bottom surface of the water tank, a vertical portion coupled to a lower end portion of the outer shell, and a round portion configured to connect an outer side end of the horizontal portion and a lower end portion of the vertical portion and formed in a shape convexly bent outward so as to distribute water pressure of the heat medium.

The smoke tube boiler may include a leakage preventing member interposed between the edge portion of the lower plate and the edge portion of the condensate tray and configured to prevent leakage of condensate.

The leakage preventing member may be provided in a form surrounding the round portion and the vertical portion of the lower plate so that sideward movement of condensate formed on the horizontal portion of the lower plate is blocked by the leakage preventing member and the condensate drops downward.

A close contact protrusion may be formed at an inner side surface of the leakage preventing member so as to protrude in a direction toward an outer side surface of the lower plate. The close contact protrusion may be provided as a plurality of close contact protrusions spaced apart from the inner side surface of the leakage preventing member.

A first flange portion configured to support the sealing member may be disposed at the edge portion of the condensate tray, and a fastening protrusion and a fastening groove which are fastened to each other may be formed at positions corresponding to the leakage preventing member and the first flange portion.

An extending portion configured to extend upward from an outer side end of the first flange portion and come in close contact with an outer side surface of the leakage preventing member and a second flange portion configured to extend outward from an end of the extending portion may be further disposed at the edge portion of the condensate tray, and a fitting protrusion and a fitting groove which are fitted to each other may be formed at positions corresponding to an upper portion of the leakage preventing member and the second flange portion.

An exhaust guide having a plurality of holes formed therein may be disposed inside the condensate tray so that the combustion gas that passed through the heat exchanger is uniformly distributed and discharged to the entire area of the condensate tray.

A step portion configured to guide the combustion gas that passed through the exhaust guide toward the condensate outlet may be formed on a bottom surface of the condensate tray so that, inside the condensate tray, the discharge of the condensate and the flow of the combustion gas occur in the same direction.

The smoke tube boiler may further include a pre-mixing chamber having a space provided therein in which air for combustion and gas which are supplied to the mix chamber are pre-mixed. The space in which the air and gas are pre-mixed may be divided in multiple stages by a Venturi structure inside the pre-mixing chamber, and a direction of flow of the gas supplied into the pre-mixing chamber and a direction of flow of the air supplied into the pre-mixing chamber may be parallel.

The smoke tube boiler may further include a mixture regulating part configured to open and close flow paths of the air and gas that pass through the pre-mixing chamber and regulate a supply flow rate of the mixture.

A first gas distributing member configured to distribute and supply gas supplied from a first gas supply hole to a throat portion of a first path may be coupled to the first path, and a second gas distributing member configured to distribute and supply gas supplied from a second gas supply hole to a throat portion of a second path may be coupled to the second path.

The mixture regulating part may include a first opening/closing member configured to open and close a flow path of air passing through the second path and a second opening/closing member configured to open and close a flow path of gas that is connected to the second path, and opening/closing operations of the first opening/closing member and the second opening/closing member may be simultaneously performed by interlocking.

The first opening/closing member may include a body coupled to a rotating shaft of a driving part and disposed in a transverse direction in the second path and a wing portion formed in a size corresponding to the second path and coupled to oppose an outer side surface of the body, and the second opening/closing member may reciprocate in the transverse direction by interlocking with rotation of the first opening/closing member.

A first sharp edge portion configured to protrude toward the second opening/closing member and a first bottom portion recessed in the opposite direction may be alternately formed in the circumferential direction on the body of the first opening/closing member, a first inclined portion may be formed in a section between the first sharp edge portion and the first bottom portion, a second sharp edge portion, a second bottom portion, and a second inclined portion which have shapes corresponding to the first sharp edge portion, the first bottom portion, and the first inclined portion may be formed on a body of the second opening/closing member, and the second opening/closing member may be elastically supported by an elastic member so as to be pressed toward the first opening/closing member.

The second opening/closing member may further include a guide member configured to guide the body of the second opening/closing member to reciprocate, and a guide groove and a guide rib may be formed at corresponding positions in the body of the second opening/closing member and the guide member.

At the time of contact between the first sharp edge portion of the first opening/closing member and the second bottom portion of the second opening/closing member and contact between the first bottom portion of the first opening/closing member and the second sharp edge portion of the second opening/closing member, while the wing portion of the first opening/closing member is disposed in a direction parallel to a transverse cross-section of the second path so that flow of air to the second path is blocked, the second opening/closing member may be moved toward one side and come in close contact with a communication hole disposed in a gas flow path connected to the second path so that flow of gas to the second path is blocked. At the time of contact between the first sharp edge portion of the first opening/closing member and the second sharp edge portion of the second opening/closing member, while the wing portion of the first opening/closing member is disposed in a direction perpendicular to the transverse cross-section of the second path so that the second path is opened, the second opening/closing member may be moved toward the other side and spaced apart from the communication hole so that the gas flow path connected to the second path is opened.

Advantageous Effects

According to a smoke tube boiler according to the present invention, a flat-shaped mix chamber body and a flat plate-shaped burner are provided, an upper plate formed of an end plate structure is lowered to the lowest height at which complete combustion of a mixture is possible, and heat exchange efficiency of a heat exchanger is improved. In this way, the height of the boiler can be lowered as compared to those of existing boilers, and it is possible to provide a high-efficiency, compact boiler.

Also, in order to apply the flat plate-shaped burner which is easier to manufacture than a cylindrical burner and has high productivity, a sealing means is provided in installing a firing rod assembly to pass through one side portion of a mix chamber. In this way, leakage of mixed gas and exhaust gas can be prevented. Also, unlike in the related arts, a heat insulating material is not used in the mix chamber. In this way, problems that may be caused by the use of heat insulating material, such as tube blockage, may be fundamentally prevented.

Also, an air-cooled cooling means and a water-cooled cooling means are provided as cooling means for the firing rod assembly coupled to pass through one side portion of the mix chamber and the sealing means in the vicinity of the firing rod assembly. In this way, damage caused by degradation of the sealing means can be prevented, and thus durability of the smoke tube boiler can be improved.

Also, by forming an upper plate and a lower plate, which constitute the heat exchanger, to have an end plate structure, deformation and damage to the heat exchanger can be prevented by the water pressure being distributed even in an environment with high water pressure. Thus, the heat exchanger can be used not only for boilers but also for water heaters with high water pressure.

Also, by providing a turbulator inside a tube, a turbulent flow can be accelerated in the flow of combustion gas, and thus heat exchange efficiency can be improved.

Also, by providing an upper turbulator configured to come in close contact with the tube and increase thermal conductivity at an upper portion of the tube disposed in the vicinity of a combustion chamber, high-temperature oxidation and burnout due to combustion heat can be prevented. By providing a lower turbulator, which is configured to induce occurrence of a turbulent flow in the flow of the combustion gas, below the upper turbulator, heat exchange efficiency between the combustion gas and heat medium can be improved.

Also, by providing pressure support means, which may be implemented in various forms, in the turbulator, deformation and damage to the tube can be prevented even in an environment with high water pressure. Thus, in addition to being applicable to boilers, the tube can be applied to water heaters (which are used under a pressure of 10 kg/cm$^2$ or higher) and commercial (large-capacity) products relating thereto.

Also, by arranging a barrier having a multi-stage structure on a heat medium flow path and changing a heat medium flow direction, a length of a heat medium flow path is increased such that heat exchange efficiency can be improved, and a heat medium flow speed is increased such that localized overheating, which may be caused when the heat medium is stagnated, can be prevented and occurrence of boiling noise and degradation of thermal efficiency, which may be caused by solidification and deposition of foreign substances included in the heat medium that are caused by the localized overheating, can be prevented.

Also, a leakage preventing member configured to prevent leakage of condensate is provided between the condensate tray and the lower plate having an end plate structure, wherein the leakage preventing member is provided in a form surrounding a round portion and a vertical portion of the lower plate, and a plurality of close contact protrusions are provided on an inner side surface of the leakage preventing member. In this way, corrosion due to the condensate stagnating on the lower plate can be prevented, and leakage of the condensate can be reliably prevented.

Also, by inducing an exhaust gas flow direction and a condensate discharge direction to be the same direction, which is toward a condensate outlet, inside the condensate tray, the condensate can be smoothly discharged.

Also, by dividing an inner portion of a pre-mixing chamber in multiple stages by a Venturi structure and making a gas ejection direction to be the same as an air flow direction, a turn-down ratio (TDR) of 10:1 or higher can be implemented, and a stable combustion state can be implemented even in a range in which the load of heating or heating water is small. In addition, by minimizing changes in amounts of air and gas being mixed at the time of regulating a flow rate of the mixture, combustion efficiency can be improved, and generation of pollutants can be minimized.

Also, by a mixture regulating part opening and closing a partial area of the pre-mixing chamber, the flow rate of the mixture of air and gas can be proportionally regulated corresponding to the size of output of a burner.

DESCRIPTION OF DRAWINGS

FIG. 1 is a view schematically illustrating a configuration of a conventional smoke tube boiler.

FIG. 2 is a perspective view of an exterior of a smoke tube boiler according to the present invention.

FIG. 3 is a perspective view of a mix chamber.

FIG. 4 is a perspective view of a lower surface side of the mix chamber.

FIG. 5 is an exploded perspective view showing a structure in which a firing rod and a flame sensing rod are coupled to the mix chamber.

FIG. 6 is a plan view of the mix chamber and a heat exchanger.

FIG. 7 is a cross-sectional perspective view of a portion taken along line A-A of FIG. 6.

FIG. 10 is a see-through perspective view of the heat exchanger.

FIG. 11 is an exploded perspective view of the heat exchanger.

FIG. 12 is a front view of a state in which a tube assembly and multi-stage barriers are coupled.

FIG. 13A is a plan view of FIG. 12, FIG. 13B is a cross-sectional view taken along line B-B of FIG. 12, and FIG. 13C is a cross-sectional view taken along line C-C of FIG. 12.

FIG. 14 is a plan view of the heat exchanger.

FIG. 15 is a cross-sectional perspective view taken along line D-D of FIG. 14.

FIG. 16 is a see-through perspective view of a tube assembly according to a first embodiment of the present invention.

FIG. 17 is an exploded perspective view of the tube assembly according to the first embodiment of the present invention.

FIG. 18 is a front view of an upper turbulator and a lower turbulator according to the first embodiment of the present invention.

FIG. 19 is an enlarged perspective view of the upper turbulator illustrated in FIG. 17.

FIG. 20 is a plan view of FIG. 19.

FIG. 21A is a cross-sectional view taken along line E-E of FIG. 20, and FIG. 21B is a cross-sectional perspective view taken along line E-E of FIG. 20.

FIG. 22 is a left side view of FIG. 19.

FIG. 23 is a see-through perspective view of a tube assembly according to a second embodiment of the present invention.

FIG. 24 is a front view of a turbulator according to the second embodiment of the present invention.

FIG. 25 is a front view of a turbulator according to a third embodiment of the present invention.

FIG. 26A, FIG. 26B, FIG. 26C and FIG. 26D show cross-sectional views illustrating various embodiments of a support structure of a tube.

FIG. 27 is a see-through perspective view of a smoke tube boiler according to the present invention.

FIG. 28 is an exploded perspective view of the smoke tube boiler according to the present invention.

FIG. 29A is a plan view of a leakage preventing member, and FIG. 29B is an enlarged cross-sectional view taken along line F-F.

FIG. 30 is a cross-sectional view showing a sealing structure and a condensate discharge structure of the smoke tube boiler according to the present invention.

FIG. 31 is a perspective view of a pre-mixing chamber and a mixture regulating part.

FIG. 32 is an exploded perspective view of FIG. 31.

FIG. 33A is a side view of a pre-mixing chamber body, and FIG. 33B is a cross-sectional view of the pre-mixing chamber body taken along line G-G.

FIG. 34A is a plan view of a first mixing chamber guide member and FIG. 34B is a plan view of a second mixing chamber guide member.

FIG. 35 is a plan view of the pre-mixing chamber and the mixture regulating part when a small quantity of heat is used.

FIG. 36 is a cross-sectional view taken along line H-H of FIG. 35.

FIG. 37 is a plan view of the pre-mixing chamber and the mixture regulating part when a large quantity of heat is used.

BEST MODE OF THE INVENTION

Figure 8:
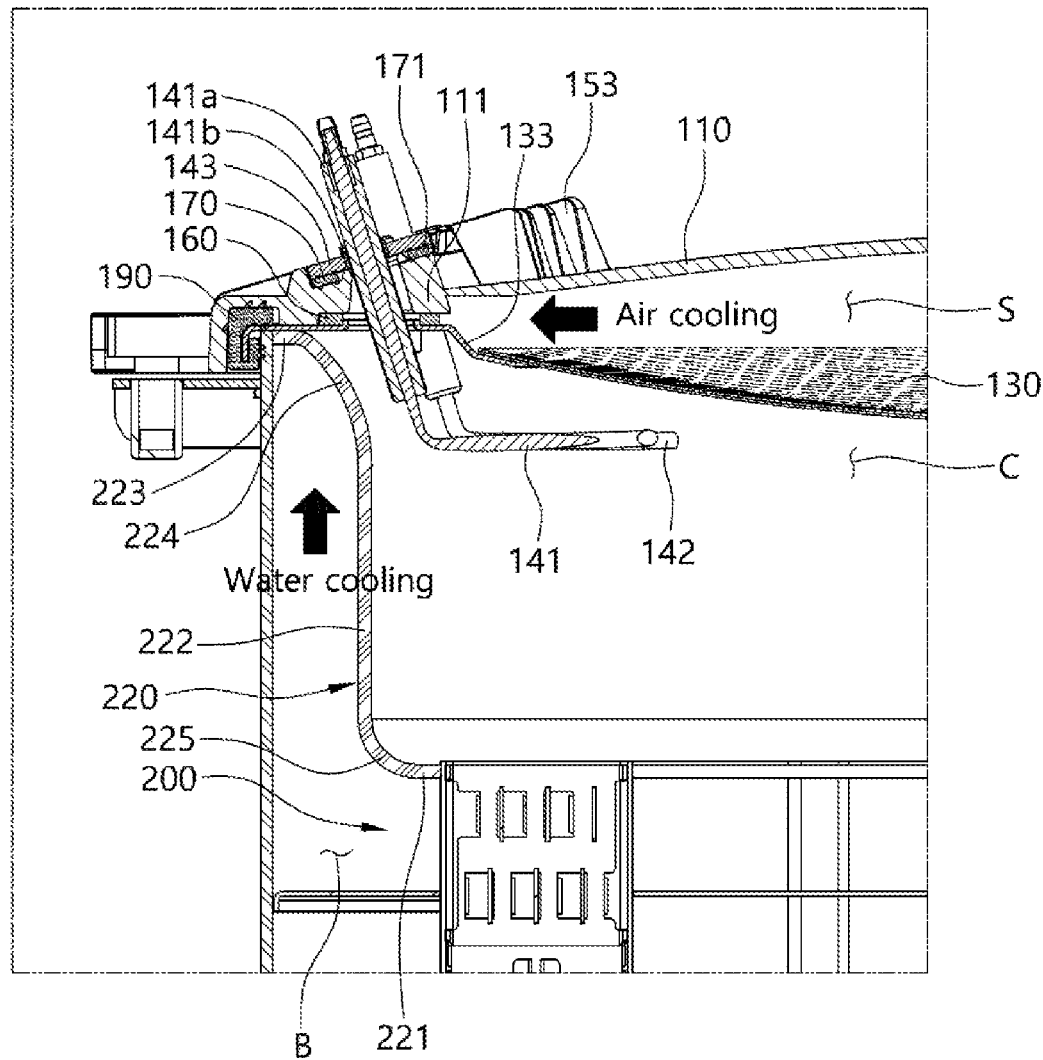
FIG. 8 is a cross-sectional view of a portion taken along line A-A of FIG. 6.

Hereinafter, configurations and actions relating to exemplary embodiments of the present invention will be described in detail with reference to the accompanying drawings.

A smoke tube boiler 1 according to the present invention is formed of a compact structure by lowering the overall height of the boiler. To this end, the smoke tube boiler 1 includes: a mix chamber 100 which is disposed above a combustion chamber C and includes a mixing space S in which combustion gas and air are mixed, a mix chamber body 110 having a flat shape, and a flat plate-shaped burner 130; a heat exchanger 200 which includes an outer shell 210 forming an outer wall of a water tank B into and from which a heat medium is introduced and discharged and which accommodates the heat medium, an upper plate 220 having an end plate structure that is configured to form the combustion chamber C and coupled to an inner side of the outer shell 210 so that a heat medium flow path is formed between the upper plate 220 and the outer shell 210, a plurality of tubes 230 formed in a flat shape that are configured to allow combustion gas generated in the combustion chamber C to flow therein and cause a heat exchange to occur between the combustion gas and the heat medium flowing outside the tubes 230, turbulators 240, 250, 280, and 290 coupled to an inner side of the tube 230 and configured to induce occurrence of a turbulent flow in the flow of the combustion gas, multi-stage barriers 261, 262, and 263 disposed between the outer shell 210 and the tube 230 and configured to induce a heat medium flow direction to be alternately changed between a radially inward direction and a radially outward direction, and a lower plate 270 having an end plate structure that is configured to support a lower end portion of the tube 230 and form a bottom surface of the water tank B; and a condensate tray 300 configured to collect condensate CW generated at the lower plate 270, guide the collected condensate CW toward a condensate outlet 310 formed at one side, and guide the combustion gas that passed through the tube 230 toward an exhaust duct 400 which is connected to an upper side of the condensate outlet 310 and disposed at one side of the outer shell 210.

Also, the smoke tube boiler 1 may further include a pre-mixing chamber 500 in which air for combustion and gas which are supplied to the mix chamber 100 are pre-mixed and a mixture regulating part 600 configured to open and close flow paths of the air and gas that pass through the pre-mixing chamber 500 and regulate a supply flow rate of the mixture.

Referring to FIGS. 2 to 8, the mix chamber 100 includes the mix chamber body 110 which is formed in a flat shape that is convex upward, a firing rod assembly 140 assembled to pass through one side portion of the mix chamber body 110 and configured to extend across an upper portion of the combustion chamber C toward a lower side of the flat plate-shaped burner 130, and sealing means 160, 170, and 180 configured to block leakage of mixed gas of the mixing space S and exhaust gas of the combustion chamber C to the outside through a gap between the mix chamber 100 and the firing rod assembly 140.

A burner applied to the present invention is the flat plate-shaped burner 130, wherein the flat plate-shaped burner 130 includes a flat plate-shaped flame hole plate 131 having a plurality of flame holes 131a formed therein and metal fibers 132 coupled to the flame hole plate 131. The mixing space S between a lower surface of the mix chamber body 110 and an upper surface of the flat plate-shaped burner 130 may be formed in a flat disc shape so that the height of the mix chamber 100 is low.

Also, unlike the conventional cylindrical burner, the flat plate-shaped burner 130 is provided across the entire area of the mixing space S, and thus gas and air introduced into the flat plate-shaped burner 130 are supplied to an edge portion of the flat plate-shaped burner 130, i.e., a position in the vicinity of positions where the sealing means 160, 170, and 180 are provided. Therefore, air-cooled cooling of the sealing means 160, 170, and 180 may be performed by the gas and air, and a combustion area may be expanded to decrease a load per unit area so that emission of pollutants such as CO and NOx is reduced and combustion performance is improved.

The firing rod assembly 140 assembled to pass through the one side portion of the mix chamber 100 may include a firing rod 141 and a flame sensing rod 142, and the firing rod 141 may include a first firing rod 141-1 and a second firing rod 141-2. Insulators 141a and 142a formed of an insulating material are coupled to outer side surfaces of the firing rod 141 and the flame sensing rod 142, and bushings 141b and 142b for maintaining airtightness are coupled to outer side surfaces of the insulators 141a and 142a.

The firing rod 141, the insulator 141a, and the bushing 141b are fixed to a firing rod coupling plate 143, and the flame sensing rod 142, the insulator 142a, and the bushing 142b are fixed to a flame sensing rod coupling plate 144. The insulators 141a and 142a are insulating means for preventing occurrence of sparks due to energization during ignition, and the bushings 141b and 142b are configurations for sealing gaps between the outer side surfaces of the insulators 141a and 142a and the firing rod coupling plate 143 and the flame sensing rod coupling plate 144.

Referring to FIG. 5, a firing rod assembly coupling part 150 configured to assemble the firing rod assembly 140 is provided at the one side portion of the mix chamber 100. The firing rod assembly coupling part 150 includes a second sealing member seating portion 151 formed in the shape of a groove so that the firing rod coupling plate 143 and a second sealing member 170 coupled to a lower side thereof are seated and a third sealing member seating portion 152 formed in the shape of a groove so that the flame sensing rod coupling plate 144 and a third sealing member 180 coupled to a lower side thereof are seated. Also, a plurality of heat dissipating fins 153 configured to dissipate combustion heat are provided along a circumference of the firing rod assembly coupling part 150.

Referring to FIGS. 6 to 8, at the one side portion of the mix chamber body 110, a mix chamber flange 111 and a burner flange 133, which is connected to support the edge portion of the flat plate-shaped burner 130, are provided to come in contact and seal the mixing space S, and the firing rod assembly 140 is assembled to pass through the mix chamber flange 111 and the burner flange 133 at a position spaced apart from the mixing space S.

The sealing means include a first sealing member 160 provided at a portion where the mix chamber flange 111 and the burner flange 133 come in contact and configured to prevent leakage of the mixed gas, which is introduced into the mixing space S, to the outside. The first sealing member 160 may be formed of a heat-resistant graphite material.

Also, the sealing means include the second sealing member 170 provided between the mix chamber flange 111 and the firing rod coupling plate 143 and configured to prevent leakage of exhaust gas, which is generated in the combustion chamber C, to the outside and the third sealing member 180 provided between the mix chamber flange 111 and the flame sensing rod coupling plate 144 and configured to prevent leakage of the exhaust gas generated in the combustion chamber C to the outside. The second sealing member 170 and the third sealing member 180 may be formed of a rubber material. The second sealing member 170 and the third sealing member 180 are separately manufactured using separate components and assembled so that deformation of the rubber material due to a high temperature is minimized.

Also, a plurality of close contact protrusions 171 may be formed at predetermined intervals on an outer side surface of the second sealing member 170 and an outer side surface of the third sealing member 180 so as to protrude outward. The close contact protrusions 171 may further improve sealing performance by coming in close contact with a lower surface of the firing rod coupling plate 143 and an upper surface of the second sealing member 170 and coming in close contact with a lower surface of the flame sensing rod coupling plate 144 and an upper surface of the third sealing member 180.

Also, since, as described above, the bushings 141b and 142b are coupled to the outer side surfaces of the insulators 141a and 142a in the firing rod assembly 140, leakage of the mixed gas to the outside of the mix chamber 100 may be more reliably blocked.

Hereinafter, configurations and actions of cooling means for blocking transfer of combustion heat to the sealing means and dissipating heat will be described with reference to FIGS. 7 and 8.

The cooling means is a configuration for blocking transfer of heat to the sealing means configured to prevent leakage of combustion heat generated in the combustion chamber C through a gap between the mix chamber 100 and the firing rod assembly 140. The cooling means may include an air-cooled cooling means and a water-cooled cooling means.

As described above, at the one side portion of the mix chamber 100, the mix chamber flange 111 and the burner flange 133 are provided to come in contact and seal the mixing space S, the firing rod assembly 140 is assembled to pass through the mix chamber flange 111 and the burner flange 133, and the air-cooled cooling means may cause the mix chamber flange 111 and the burner flange 133 to be cooled by convection using the mixed gas introduced into the mixing space S.

Meanwhile, the heat exchanger 200 may be configured as a smoke tube heat exchanger and include the outer shell 210, the upper plate 220 configured to form a bottom surface of the combustion chamber C and an upper surface of the heat exchanger 200, the plurality of tubes 230 along which combustion gas flows and which have an upper end portion configured to pass through and be coupled to a tube insertion hole 221a formed in the upper plate 220, and the water tank B disposed inside the outer shell 210 outside the tubes 230 so as to accommodate a heat medium. The heat medium may be heating water or hot water used for heating or heating water.

The water-cooled cooling means may be provided so that an upper plate flange 223, which comes in contact with a heat medium of the heat exchanger 200 disposed below the combustion chamber C, comes in surface contact with the burner flange 133. The water-cooled cooling means may cause the burner flange 133 and the sealing means 160, 170, and 180 to be cooled by conduction from the heat medium stored in the water tank B.

Also, as described above, the plurality of heat dissipating fins 153 are provided along the circumference of the firing rod assembly 140 at the one side portion of the mix chamber body 110 to which the firing rod assembly 140 is assembled. The heat dissipating fins 153 also serve as a cooling means.

According to the present invention described above, since the mix chamber 100 includes the mix chamber body 110 having a flat shape and the flat plate-shaped burner 130, the height of the mix chamber 100 may be significantly reduced as compared to a structure including the conventional cylindrical burner.

Also, since the sealing means and cooling means are provided in assembling the firing rod assembly 140 to pass through the one side portion of the mix chamber body 110 including the flat plate-shaped burner 130, leakage of the mixed gas and exhaust gas may be blocked, and thermal damage to the sealing means due to combustion heat may be prevented. Therefore, since a heat insulating material is not used in the mix chamber 100 including the flat plate-shaped burner 130, the firing rod assembly 140 may be safely assembled, and thermal damage to the sealing means may be prevented so that leakage of the mixed gas and exhaust gas is blocked.

Figure 9:
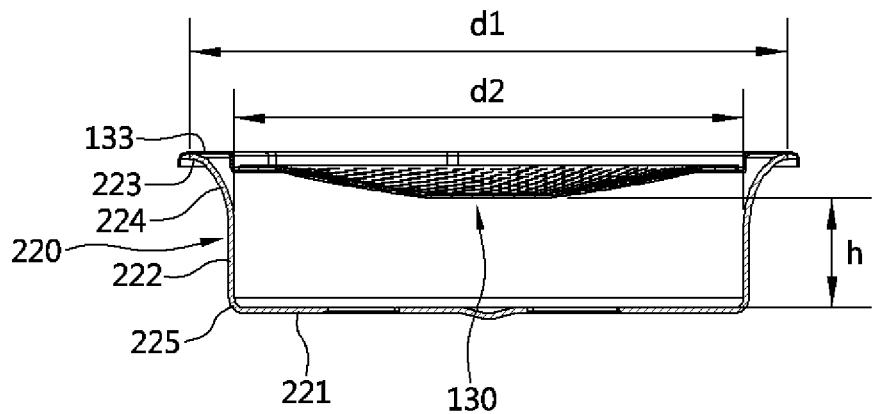
FIG. 9 is a cross-sectional view showing a coupling structure between an upper plate and a burner.

Meanwhile, referring to FIG. 9, the upper plate 200 includes a bottom portion 221 configured to form the lower surface of the combustion chamber C, a sidewall portion 222 configured to form a sidewall of the combustion chamber C, a round portion 224 which includes the upper plate flange 223, on which the burner flange 133 is seated, and is configured to connect an upper end of the sidewall portion 222 and an inner side end of the upper plate flange 223, and a round portion 225 configured to connect an outer side end of the bottom portion 221 and a lower end of the sidewall portion 222.

Since the upper plate 200 includes the round portions 224 and 225 as described above, a water pressure of the heat medium stored in the water tank B may be distributed and durability of the upper plate 200 may be improved. Preferably, a ratio between an inner diameter d2 of a lower end of the round portion 224 and an outer diameter d1 of the upper plate flange 223 may be 20% or less. When the ratio is 20% or less, the flow rate and temperature of water accommodated in the water tank B may be uniformly controlled.

Also, a height h between the lower surface of the flat plate-shaped burner 130 inserted into the upper plate 220 and the bottom surface of the upper plate 220 may be set so that an end of a flame generated in the flat plate-shaped burner 130 is spaced a predetermined distance apart from the bottom surface of the upper plate 220. Preferably, the height h may be set to be around 80 mm, in consideration of the length of the flame of the flat plate-shaped burner 130. The reason for setting the height h so that the end of the flame is spaced a predetermined distance apart from the bottom surface of the upper plate 220 is that, in order to secure conditions for experimentally minimizing nitrogen oxide (NOx) and carbon monoxide (CO), a predetermined space should be secured between the end of the flame generated by the flat plate-shaped burner 130 and the bottom surface of the upper plate 220.

Also, since the height h of the upper plate 220 is designed to be low, the height of the combustion chamber C is lowered, and thus the overall height of the smoke tube boiler 1 may be lowered. That is, while the height between the lower surface of the burner and the bottom surface of the upper plate is about 190 mm when the conventional cylindrical burner is applied, the height may be reduced to around 180 mm according to the present invention. Thus, there is an advantage in that it is possible to reduce the height by about 40% as compared to the related art.

Meanwhile, in the present embodiment, the electrode rod assembly 140 is formed at a position in the vicinity of one side of a mixture inlet 120 connected to an air blower 700 that allows the mixture to be supplied to the mix chamber 100. In this case, since it is easy for a worker to approach the electrode rod assembly 140 through the mixture inlet 120, convenience in maintenance and repair may be improved.

In another embodiment, the electrode rod assembly 140 may also be disposed at a side opposite the mixture inlet 120. In this case, since the mixture supplied from the air blower 700 is directly supplied to the electrode rod assembly 140, delayed ignition may be prevented.

Referring to FIGS. 10 to 15, the heat exchanger 200 includes tube assemblies 1000-1, 1000-2, and 1000-3, which include the outer shell 210 in which a heat medium inlet 211 and a heat medium outlet 212 are formed to allow introduction and discharge of a heat medium, the upper plate 220 coupled to an inner side of the outer shell 210, so that a heat medium flow path is formed between the upper plate 220 and the outer shell 210, and configured to form a combustion chamber C by the flat plate-shaped burner 130 being seated thereon, the plurality of tubes 230 formed in a flat shape that are configured to allow combustion gas generated in the combustion chamber C to flow therein and cause a heat exchange to occur between the combustion gas and the heat medium, and the turbulators 240, 250, 280, and 290 coupled to an inner side of the tube 230 and configured to induce occurrence of a turbulent flow in the flow of the combustion gas and support the tube 230, and the lower plate 270 configured to support the tube assemblies 1000-1, 1000-2, and 1000-3 and coupled to the condensate tray 300. Configurations and actions relating to embodiments of the tube assemblies 1000-1, 1000-2, and 1000-3 will be described below.

The multi-stage barriers 261, 262, and 263 configured to guide flow of the heat medium so that a heat medium flow direction is alternately changed between a radially inward direction and a radially outward direction may be provided at an outer side surface of the tube 230 so as to be vertically spaced apart from each other. The multi-stage barriers 261, 262, and 263 are fixed and supported by a support 264. The plurality of tubes 230 are installed in the vertical direction so that the combustion gas generated in the combustion chamber C flows downward. The plurality of tubes 230 are spaced apart in the circumferential direction and disposed radially.

In the present embodiment, the multi-stage barriers include the upper barrier 261, the middle barrier 262, and the lower barrier 263 which are formed in the shape of a plate. Referring to FIG. 13A, the upper barrier 261 includes a tube insertion hole 261a through which the tube 230 is inserted and an opening 261b formed at the center and through which the heat medium passes. Referring to FIG. 13B, the middle barrier 262 includes a tube insertion hole 262a formed while a clearance is formed between the tube insertion hole 262a and an outer side surface of the tube 230 so that the heat medium flows through the clearance formed between the tube insertion hole 262a and the tube 230. A central portion 262b of the middle barrier 262 is formed of a structure that is blocked. In one embodiment, the tube insertion hole 262a may be formed of a structure in which two different tubes 230 are inserted while being disposed at both sides so as to be spaced apart. Referring to FIG. 13C, the lower barrier 263 includes a tube insertion hole 263a and an opening 263b disposed at the center which have the same structures as those of the upper barrier 261.

According to the structures of the multi-stage barriers 261, 262, and 263, as indicated by arrows in FIGS. 14 and 15, a heat medium introduced into the outer shell 210 through the heat medium inlet 211 flows radially inward toward the opening 263b formed in the central portion of the lower barrier 263, a heat medium flowing to an upper side of the lower barrier 263 via the opening 263b flows radially outward after being distributed to a clearance space of the tube insertion hole 262a radially formed in the middle barrier 262, a heat medium flowing to an upper side of the middle barrier 262 via the tube insertion hole 262a flows radially inward toward the opening 261b, which is formed in the center of the upper barrier 261, and then passes through the opening 261b so as to be discharged via the heat medium outlet 212 formed at one side of the upper portion of the outer shell 210.

Since the heat medium flow direction is alternately changed between the radially inward direction and the radially outward direction as described above, a distance along which the heat medium flows is increased such that heat exchange efficiency of the heat exchanger 200 is improved. Also, since highly efficient heat exchange performance may be achieved even when the height of the heat exchanger 200 is lowered as compared to conventional heat exchangers, the height of the heat exchanger 200 may be lowered. In addition, since a heat medium flow speed is increased, boiling phenomenon due to localized overheating which may be caused by stagnation of the heat medium may be prevented.

Hereinafter, embodiments of the tube assemblies 1000-1, 1000-2, and 1000-3 will be described with reference to FIGS. 16 to 26.

Referring to FIGS. 16 to 22, the tube assembly 1000-1 according to a first embodiment of the present invention includes the tube 230 formed in a flat shape that is configured to allow combustion gas generated in the combustion chamber C to flow therein and cause a heat exchange to occur between the combustion gas and the heat medium flowing outside the tube 230, an upper turbulator 240 coupled to an upper inner side of the tube 230 in the vicinity of the combustion chamber so as to come in surface contact with the tube 230 so that thermal conductivity is increased and configured to induce occurrence of a turbulent flow in the flow of the combustion gas, and a lower turbulator 240 coupled to the inner side of the tube 230 below the upper turbulator 240 and configured to induce occurrence of a turbulent flow in the flow of the combustion gas.

The upper turbulator 240 includes tube contact surfaces 241 (241*a* and 241*b*) configured to come in close contact with the inner side surface of the tube 30 and pressure support parts 242 (242*a* and 242*b*) formed to be bent from cut-out portions 243 (243*a* and 243*b*) of the tube contact surfaces 241 (241*a* and 241*b*).

The tube contact surfaces 241 have a structure in which a first tube contact surface 241*a*, which comes in surface contact with an inner side surface of one side portion of the tube 230, and a second tube contact surface 241*b*, which comes in surface contact with an inner side surface of the other side portion of the tube 230, are symmetrical.

The pressure support parts 242 are configurations for preventing deformation and damage of the tube 230 due to the water pressure of the heat medium. The pressure support parts 242 include a first pressure support part 242*a* configured to protrude so that a portion of a first cut-out portion 243*a*, which is cut out from the first tube contact surface 241*a*, is bent toward the second tube contact surface 241*b* and a second pressure support part 242*b* configured to protrude so that a portion of a second cut-out portion 243*b*, which is cut out from the second tube contact surface 241*b*, is bent toward the first tube contact surface 241*a*.

A cut-out area of the first cut-out portion 243*a* is formed to be larger than a cut-out area of the second cut-out portion 243*b*, a protruding end portion of the first pressure support part 242*a* comes in contact with the second tube contact surface 241*b*, and, when the pressure support parts 242 are inserted into the tubes 230, a protruding end portion of the second pressure support part 242*b* passes through the first cut-out portion 243*a* and comes in contact with the inner side surface of the tube 230.

According to such a configuration, upon action of the water pressure, the first pressure support part 242*a* supports the first tube contact surface 241*a* and the second tube contact surface 241*b* so that shapes thereof are firmly maintained, and the second pressure support part 242*b* more firmly supports the tube 230 which is supported by the first tube contact surface 241*a* and the second tube contact surface 241*b*.

In addition, as illustrated in FIG. 22, the first pressure support part 242*a* and the second pressure support part 242*b* may be provided as a plurality of first pressure support parts 242*a* and a plurality of second pressure support parts 242*b* which are spaced apart in a longitudinal direction and a vertical direction. A first pressure support part 242*a'* disposed at an upper side and a first pressure support part 242*a"* disposed at a lower side may be disposed at positions not overlapping each other in the vertical direction, and a second pressure support part 242*b'* disposed at the upper side and a second pressure support part 242*b"* disposed at the lower side may be disposed at positions not overlapping each other in the vertical direction. According to such a configuration, the first pressure support parts 242*a* and the second pressure support parts 242*b* provided in a zigzag shape across the entire area of the upper turbulator 240 in the longitudinal and vertical directions may allow the water pressure acting on the tubes 230 to be evenly distributed and effectively prevent deformation and damage of the tubes 230.

Also, the first pressure support part 242*a* and the second pressure support part 242*b* may be formed in the shape of a plate and have a structure in which both side surfaces thereof having a large area are disposed parallel to a combustion gas flow direction. As indicated by arrows in FIG. 21A, when the combustion gas flows, flow resistance may be minimized in a process in which the combustion gas passes through the first pressure support part 242*a* and the second pressure support part 242*b*.

Referring to FIG. 18, the lower turbulator 250 may include a flat surface portion 251 disposed in a longitudinal direction of the tube 230 so as to divide an inner space of the tube 230 into two sides and a plurality of first guide pieces 252 and second guide pieces 253 formed at both side surfaces of the flat surface portion 251 so as to be spaced apart in the longitudinal direction and alternately protrude obliquely.

The first guide piece 252 may be disposed at one side surface of the flat surface portion 251 so as to be inclined toward one side, and the second guide piece 253 may be disposed at the other side surface of the flat surface portion 251 so as to be inclined toward the other side. Accordingly, a heat medium introduced into the first guide piece 252 and a heat medium introduced into the second guide piece 253 may be sequentially passed over to the second guide piece 253 and the first guide piece 252, which are disposed to be adjacent at the opposite side surfaces of the flat surface portion 251, so as to alternately flow in both side spaces of the flat surface portion 251.

A heat medium inlet end of the first guide piece 252 may be connected to one side end of the flat surface portion 251 by a first connecting piece 252*a*, and a first communication hole 252*b* through which fluid communication occurs in both side spaces of the flat surface portion 251 may be provided between the one side end of the flat surface portion 251 and the first connecting piece 252*a* and the first guide piece 252.

A heat medium inlet end of the second guide piece 253 may be connected to the other side end of the flat surface portion 251 by a second connecting piece 253*a*, and a second communication hole 253*b* through which fluid communication occurs in both side spaces of the flat surface portion 251 may be provided between the other side end of the flat surface portion 251 and the second connecting piece 253*a* and the second guide piece 253.

The first guide piece 252 and the second guide piece 253 may have portions cut out from the flat surface portion 251 so as to be bent toward both sides of the flat surface portion 251, and fluid communication may occur in both side spaces of the flat surface portion 251 through the cut-out portions of the flat surface portion 251. Also, supports 253 (253a and 253b) which protrude outward and come in contact with opposite inner side surfaces of the tube 230 are formed on both side surfaces of the lower turbulator 250. Also, a first support part 255 and a second support part 256 which are vertically spaced apart and protrude forward and rearward so as to come in contact with both side surfaces of the tube 230 may be formed at an upper end portion and a lower end portion of the lower turbulator 250.

Referring to FIGS. 23 and 24, the tube assembly 1000-2 according to a second embodiment of the present invention includes the tube 230 formed in a flat shape that is configured to allow combustion gas to flow therein and cause a heat exchange to occur between the combustion gas and the heat medium flowing outside the tube 230, a turbulator 280 coupled to an inner side of the tube 230 and configured to induce occurrence of a turbulent flow in the flow of the combustion gas, and a pressure support part formed at the inner side of the tube 230 and configured to support an external pressure that acts on both opposite side surfaces of the tube 230.

The pressure support part may include a pair of dimples 231 configured to protrude from both side surfaces of the tube 230 toward the inner space of the tube 230 and face each other. The pair of dimples 231 may be provided as a plurality of pairs of dimples 231 which are vertically spaced apart.

The dimple 231 is formed by a process in which the turbulator 280 is inserted into the tube 230 and then the outer side surface of the tube 230 is pressed toward the inner side of the tube 230. Also, a plurality of holes 288 are formed in the turbulator 280 so that, when an external pressure rises, the pair of dimples 231 may come in contact by the holes 288 passing through the dimples 231.

Since the pressure support part is implemented by forming the dimple 231 at the outer side surface of the tube 230 into which the turbulator 280 is inserted, the pressure support part may be implemented without adding a separate component. Therefore, the cost for manufacturing a tube assembly having excellent pressure resistance may be reduced.

Also, first support pieces 286 (286a and 286b) and second support pieces 287 (287a and 287b) which are vertically spaced apart and protrude forward and rearward so as to come in contact with a front surface and a rear surface of the tube 230 may be formed at an upper end portion and a lower end portion of the turbulator 280.

Referring to FIG. 24, although not described herein, reference numeral "281" denotes a flat surface portion, reference numeral "282" denotes a first guide piece, reference numeral "282a" denotes a first connecting piece, reference numeral "282b" denotes a first communication hole, reference numeral "283" denotes a second guide piece, reference numeral "283a" denotes a second connecting piece, reference numeral "283b" denotes a second communication hole, reference numeral "284" denotes a first support part, and reference numeral "285" denotes a second support part. Each element performs the same function as the element referred to by the same name among the elements described above.

Referring to FIG. 25, a turbulator 290 constituting the tube assembly 1000-3 according to a third embodiment of the present invention has a structure in which an upper turbulator 290a disposed at a combustion gas inlet side and a lower turbulator 290b disposed at a combustion gas outlet side are integrally formed. In order to make a flow path between the lower turbulator 290b and the inner side surface of the tube 230 to have a smaller area than a flow path between the upper turbulator 290a and the inner side surface of the tube 230, an area coming in contact with the heat medium inside the tube 230 may be formed to be larger in the lower turbulator 290b than in the upper turbulator 290a.

In one embodiment, an interval L2 at which a plurality of first guide pieces 292 and second guide pieces 293 formed in the lower turbulator 290b are vertically spaced apart may be smaller than an interval L1 at which a plurality of first guide pieces 292 and second guide pieces 293 formed in the upper turbulator 290a are vertically spaced apart.

In this case, the interval at which the plurality of first guide pieces 292 and second guide pieces 293 formed in the turbulator 290 are vertically spaced apart may be formed to gradually decrease from the combustion gas inlet side to the combustion gas outlet side.

According to such a configuration, by making a flow path of combustion gas in a high-temperature state that passes through the upper portion of the tube 230 to have a large area, a sufficient heat exchange may occur while flow resistance of the combustion gas is reduced. By making a flow path of combustion gas in a relatively low temperature state due to the heat exchange that passes through the lower portion of the tube 230 to have a relatively small area, residence time of the combustion gas may be increased. In this way, heat exchange efficiency may be improved.

Referring to FIG. 25, although not described herein, reference numeral "291" denotes a flat surface portion, reference numeral "292a" denotes a first connecting piece, reference numeral "292b" denotes a first communication hole, reference numeral "293a" denotes a second connecting piece, reference numeral "293b" denotes a second communication hole, reference numeral "294" denotes a first support part, reference numeral "295" denotes a second support part, and reference numerals "296" and "297" denote support pieces. Each element performs the same function as the element referred to by the same name among the elements described above.

Referring to FIG. 26A, FIG. 26B, FIG. 26C and FIG. 26D, a support part configured to provide support against the water pressure of the heat medium may be further disposed inside the tube 230.

The support part may include a straight support 232 having both ends fixed to the inner side surface of the tube 230 as illustrated in FIG. 26A and a support 233 having both ends bent and fixed to the inner side surface of the tube 230 as illustrated in FIGS. 26B and 26C.

Regarding the structures illustrated in FIGS. 26A and 26B, during manufacture of the tube 230, one side ends of the supports 232 and 233 are welded to a base material on which the tube 230 will be formed, the base material is rolled and processed in the shape of the tube 230, both side end portions of the base material and the other side ends of the supports 232 and 233 are welded, and the turbulator 290 is inserted into both sides of the supports 232 and 233 and coupled thereto.

Regarding the structure illustrated in FIG. 26C, during manufacture of the tube 230, the support 233 and the turbulator 290 may be coupled first, and then a coupling body consisting of the support 233 and the turbulator 290 may be coupled by being press-fitted into the tube 230.

In another embodiment, as illustrated in FIG. 26D, the support part may include embossments 234 formed to protrude from both side surfaces of the tube 230, which correspond to each other, toward the inner side of the tube 230. According to such a configuration, when a high water pressure acts from outside the tube 230, the embossments 234 formed at corresponding positions may come in contact with each other, and thus deformation of the tube 230 may be prevented.

Since the support parts 232, 233, and 234 are coupled to the inner side of the tube 230 as described above, even when the water pressure of the heat medium acting on the outer side surface of the tube 230 is high, the deformation of the tube 230 may be prevented. Therefore, the tube 230 having the support parts 232, 233, and 234 coupled thereto may be applied not only to boilers or water heaters but also to other combustion devices for various purposes.

Meanwhile, referring to FIGS. 27 to 30, the smoke tube boiler 1 according to the present invention includes a condensate tray 300, which is configured to collect and discharge condensate generated due to condensation of water vapor included in combustion gas that occurs due to the combustion gas passing through the heat exchanger 200, and a leakage preventing member 320 coupled to a connecting portion between the lower plate 270 of the heat exchanger 200 and the condensate tray 300 and configured to prevent leakage of the condensate.

Also referring to FIG. 11, the lower plate 270 is formed of an end plate structure that includes a horizontal portion 271 configured to form the bottom surface of the water tank B and support the lower end portion of the tube 230 by having a plurality of tube insertion holes 271a formed to pass through the lower end portion of the tube 230, a vertical portion 272 coupled to the lower end portion of the outer shell 210, and a round portion 273 configured to connect an outer side end of the horizontal portion 271 and a lower end portion of the vertical portion 272 and formed in a shape convexly bent outward so as to distribute the water pressure of the heat medium.

As described above, the round portion 273 having the shape convexly bent outward is formed at a corner where the horizontal portion 271 and the vertical portion 272 of the lower plate 270 are connected. In this way, since the water pressure of the heat medium may be distributed, water pressure resistance of the lower plate 270 may be improved, deformation of the lower plate 270 may be minimized, and thus durability of the lower plate 270 may be improved.

Hereinafter, a coupling structure between the condensate tray 300 and the leakage preventing member 320 will be described.

Referring to FIGS. 29A, 29B and 30, the leakage preventing member 320 is interposed between an edge portion of the lower plate 270 and an edge portion of the condensate tray 300 so as to prevent leakage of the condensate. A body 321 of the leakage preventing member 320 is provided in a form surrounding lower portions of the round portion 273 and the vertical portion 272 of the lower plate 270. Thus, sideward movement of the condensate CW formed on the horizontal portion 271 of the lower plate 270 may be blocked by a bottom portion 233 formed to extend from a lower portion of the body 321 toward one side, and the condensate CW may drop downward.

Meanwhile, a close contact protrusion 322 may be formed at an inner side surface 321a of the leakage preventing member 320 so as to protrude in a direction toward an outer side surface of the lower plate 270. The close contact protrusion 322 may be provided as a plurality of close contact protrusions 322a, 322b, 322c, 322d. 322e, and 322f which are formed at the inner side surface 321a of the leakage preventing member 320 so as to be vertically spaced apart.

According to the configuration of the close contact protrusion 322, upon action of the water pressure, the close contact protrusion 322 of the leakage preventing member 320 that protrudes in a direction opposite from a direction in which the water pressure acts may come in close contact with the outer side surface of the lower plate 270 and effectively prevent a phenomenon in which the condensate CW penetrates into a gap between the lower plate 270 and the leakage preventing member 320 and leaks. Also, when the close contact protrusion 322 is provided as the plurality of close contact protrusions 322 which are vertically spaced apart, leakage of the condensate CW may be more reliably prevented.

A first flange portion 301 configured to support the leakage preventing member 302 is disposed at the edge portion of the condensate tray 300, and a fastening protrusion 301a and a fastening groove 323a which are fastened to each other are formed at positions corresponding to the leakage preventing member 320 and the first flange portion 301. Also, an extending portion 302 configured to extend upward from an outer side end of the first flange portion 301 and come in close contact with an outer side surface of the leakage preventing member 320 and a second flange portion 303 configured to extend outward from an end of the extending portion 302 are further disposed at the edge portion of the condensate tray 300, and a fitting protrusion 324a and a fitting groove 324b which are fitted to each other are formed at positions corresponding to an upper portion of the leakage preventing member 320 and the second flange portion 303. According to such a configuration, it is possible to simultaneously block leakage of the condensate CW and firmly fix the position of the leakage preventing member 320.

Meanwhile, referring to FIG. 28, an exhaust guide 330 having a plurality of holes 331 (331a and 331b) formed therein is disposed inside the condensate tray 300 so that the combustion gas that passed through the heat exchanger 200 is uniformly distributed and discharged to the entire area of the condensate tray 300. The holes 331 may be formed in different sizes in consideration of a combustion gas flow direction.

Also, a step portion 304 configured to guide the combustion gas that passed through the holes 331 of the exhaust guide 330 to flow toward the condensate outlet 310 formed at a lower portion of one side of the condensate tray 300 is formed on a bottom surface of the condensate tray 300. Thus, as indicated by a dotted-line arrow, which corresponds to a condensate discharge direction, and a solid-line arrow, which corresponds to a combustion gas flow direction, in FIG. 30, the discharge of the condensate and the flow of the combustion gas occur in the same direction inside the condensate tray 300. According to such a configuration, by guiding the condensate in a direction in which exhaust gas flows, corrosion of the lower plate 270 due to stagnation of the condensate may be prevented, and the condensate may be guided toward the condensate outlet 310 and smoothly discharged.

Meanwhile, as illustrated in FIGS. 31 to 38, the smoke tube boiler 1 according to the present invention further includes a pre-mixing chamber 500 having a space provided therein in which air for combustion and gas which are supplied to the mix chamber 100 are pre-mixed and a mixture regulating part 600 configured to open and close flow paths of the air and gas that pass through the pre-mixing chamber 500 and regulate a supply flow rate of the mixture. The space in which the air and gas are pre-mixed is divided in multiple stages by a Venturi structure inside the pre-mixing chamber 500, and a direction of flow of the gas supplied into the pre-mixing chamber 500 and a direction of flow of the air supplied into the pre-mixing chamber may be parallel.

In one embodiment, the pre-mixing chamber 500 is divided into a first path 510 and a second path 520 by a partition member 501 disposed therebetween. An air flow path and a gas flow path connected to the first path 510 may be in an open state at all times, and an air flow path and a gas flow path connected to the second path 520 may be opened and closed by the mixture regulating part 600.

Referring to FIG. 33A and FIG. 33B, a first gas supply hole 530 is provided in an upper portion of one side of the pre-mixing chamber 500, and gas supplied through the first gas supply hole 530 is supplied to the first path 510 via a first space 531 and a first gas discharge hole 532. A second gas supply hole 540 is provided in a lower portion of the one side of the pre-mixing chamber 500, and gas supplied through the second gas supply hole 540 is supplied to the second path 520 via a second space 541, a communication hole 542, a third space 543, and a second gas discharge hole 544. The second space 541 and the third space 543 may be spatially separated and come in communication with each other when the communication hole 542 is open. One side surfaces of the second space 541 and the third space 543 may be sealed by a fixing plate 502. The communication hole 542 may be opened and closed by a second opening/closing member 650 of the mixture regulating part 600 which will be described below.

An air inlet 800 is connected to the first path 510 and the second path 520.

A first gas distributing member 550 configured to distribute and supply gas supplied from the first gas supply hole 530 to a throat portion of the first path 510 may be coupled to the first path 510, and a second gas distributing member 560 configured to distribute and supply gas supplied from the second gas supply hole 540 to a throat portion of the second path 520 may be coupled to the second path 520.

Referring to FIG. 34A and FIG. 34B, a plurality of first distribution holes 551 configured to distribute and supply gas to the first path 510 in a direction parallel to an air flow direction may be formed at a lower portion of the first gas distributing member 550 so as to be spaced apart in the circumferential direction, and a plurality of second distribution holes 561 configured to distribute and supply gas to the second path 520 in the direction parallel to the air flow direction may be formed at a lower portion of the second gas distributing member 560 so as to be spaced apart in the circumferential direction.

Referring to FIGS. 34A to 38, the first gas distributing member 550 is coupled to an inner side surface of the first path 510 while a predetermined first clearance space S1 is formed therebetween, and gas discharged through the first gas discharge hole 532 passes through the first clearance space S1 and then is supplied to the first space 510 via the first distribution hole 551. The second gas distributing member 560 is coupled to an inner side surface of the second path 520 while a predetermined second clearance space S2 is formed therebetween, and gas discharged through the second gas discharge hole 544 passes through the second clearance space S2 and then is supplied to the second space 520 via the second distribution hole 561.

Referring to FIG. 32, the mixture regulating part 600 includes a first opening/closing member 640 configured to open and close a flow path of air passing through the second path 520 and the second opening/closing member 650 configured to open and close the communication hole 542, which is a flow path of gas that is connected to the second path 520, and opening/closing operations of the first opening/closing member 640 and the second opening/closing member 650 may be simultaneously performed by interlocking.

The first opening/closing member 640 includes a body 641 coupled to a rotating shaft 612 of a motor 611, which is a driving part 610, and disposed in a transverse direction in the second path 520 and a wing portion 643 formed in a size corresponding to a transverse cross-sectional area of the second path 520 and coupled to oppose an outer side surface of the body 641. The driving part 610 may be coupled to a first bracket 620 and fixed, and the first opening/closing member 640 may be coupled to a second bracket 630, which is assembled to one side surface of the pre-mixing chamber 500, and fixed.

The body 641 of the first opening/closing member 640 may include a first cam-shaped portion 642 in which a first sharp edge portion 642a configured to protrude toward the second opening/closing member 650 and a first bottom portion 642b recessed in the opposite direction are alternately formed in the circumferential direction, and a first inclined portion 642c is formed in a section between the first sharp edge portion 642a and the first bottom portion 642b. In FIG. 32, for convenience of description, the first opening/closing member 640 and the second opening/closing member 650 which are viewed in different directions are illustrated together.

The second opening/closing member 650 may include a second cam-shaped portion 652 in which a second sharp edge portion 652a, a second bottom portion 652b, and a second inclined portion 652c are formed in shapes corresponding to the first sharp edge portion 642a, the first bottom portion 642b, and the first inclined portion 642c, respectively. A shaft 651 may be coupled to the center of the second cam-shaped portion 652, an airtight member 654 configured to open and close the communication hole 542 may be coupled to one side end of the shaft 651, and one side end of an elastic member 655 may be supported by one side surface of the airtight member 654. The other side end of the elastic member 655 may be supported by an inner side surface of the pre-mixing chamber 500 that is opposite the communication hole 542. Therefore, the second opening/closing member 650 may be elastically supported by the elastic member 655 so as to be pressed toward the first opening/closing member 640.

The second opening/closing member 650 may further include a guide member 653 configured to guide the body, in which the second cam-shaped portion 652 is formed, to reciprocate, and a guide groove 652d and a guide rib 653a may be formed at corresponding positions in the body of the second opening/closing member 650 and the guide member 653.

Hereinafter, actions of the mixture regulating part 600 will be described with reference to FIGS. 35 to 38.

As illustrated in FIGS. 35 to 38, when the load set in the smoke tube boiler 1 is in a low output state, the first sharp edge portion 642a of the first opening/closing member 640 and the second bottom portion 652b of the second opening/closing member 650 come in contact with each other due to driving of the driving part 610, and, simultaneously, the first bottom portion 642b of the first opening/closing member 640 and the second sharp edge portion 652a of the second opening/closing member 650 come in contact with each other. Here, while the wing portion 643 of the first opening/closing member 640 is disposed in a direction parallel to a transverse cross-section of the second path 520 such that the flow of air is blocked in the second path 520, the airtight member 654 of the second opening/closing member 650 is moved toward one side (rightward in FIG. 36) due to an elastic force of the elastic member 655 and comes in close contact with the communication hole 542 such that the flow of gas is blocked in the second path 520. In this way, when the load is in the low output state, air and gas are supplied only through the first path 510.

Figure 38:
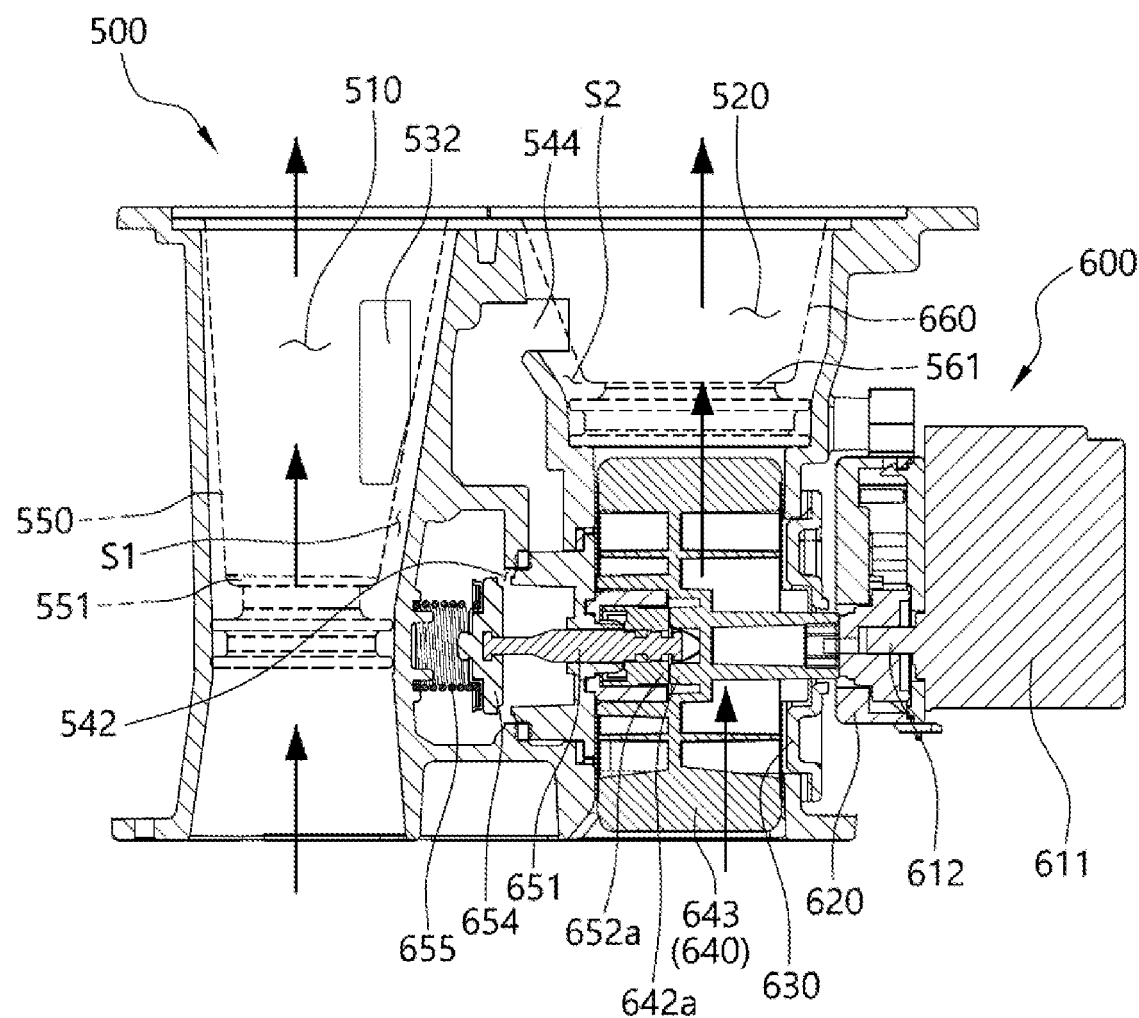
FIG. 38 is a cross-sectional view taken along line I-I of FIG. 37.

As illustrated in FIGS. 37 and 38, when the load set in the smoke tube boiler 1 is in a high output state, the first sharp edge portion 642a of the first opening/closing member 640 and the second sharp edge portion 652a of the second opening/closing member 652 come in contact with each other due to driving of the driving part 610. Here, while the wing portion 643 of the first opening/closing member 640 is disposed in a direction perpendicular to the transverse cross-section of the second path 520 such that the second path 520 is opened, the airtight member 654 of the second opening/closing member 650 is moved toward the other side (leftward in FIG. 38) while compressing the elastic member 655 and spaced apart from the communication hole 542 such that the gas flow path connected to the second path 520 is opened. In this way, when the load is in the high output state, air and gas are supplied not only through the first path 510, but also through the second path 520.

Supply flow rates of air and gas introduced into the first path 510 and the second path 520 may be regulated proportional to the set heating or water heating load, according to the number of rotations of the air blower 700 and an opening degree of a gas supply valve (not illustrated).

By making the air flow direction and the gas ejection direction to be the same in the first path 510 and the second path 520 of the pre-mixing chamber 600, gas supplied to the first path 510 and the second path 520 may not be affected by the flow of air, and a mixture containing accurate amounts of air and gas corresponding to a set air-gas ratio may be obtained.

As described above, according to the present invention, the pre-mixing chamber 500 is formed of a double structure including the first path 510 and the second path 520 which have a Venturi structure, and, in consideration of the size of heating or water heating load, when the load is in a relatively low output range, pre-mixing is performed only in the first path 510 and stopped in the second path 520, and, when the load is in a relatively high output range, pre-mixing is performed in both the first path 510 and the second path 520, and thus the turn-down ratio (TDR) may be increased.

Also, according to the present invention, by making the air flow direction and gas flow direction to be the same so that changes in amounts of air and gas being mixed are minimized in the process of opening and closing the second path 520, a combustion state may be stabilized even in a low-load range. Accordingly, combustion efficiency may be improved due to complete combustion and emission of pollutants may be reduced.

The present invention is not limited by the embodiments described above and may be modified by those of ordinary skill in the art to which the invention pertains without departing from the technical idea of the present invention defined by the claims below. Such modifications belong to the scope of the present invention.

The invention claimed is:

1. A smoke tube boiler comprising:
a mix chamber which includes a mixing space in which combustion gas and air are mixed, a mix chamber body having a flat shape, and a flat plate-shaped burner disposed in a horizontal direction above a combustion chamber and positioned over an entire upper area of the combustion chamber;
a heat exchanger which includes an outer shell forming an outer wall of a water tank into and from which a heat medium is introduced and discharged and which accommodates the heat medium, an upper plate having an end plate structure that is coupled to the outer shell and configured to form the combustion chamber, a plurality of tubes formed in a flat shape that are configured to allow combustion gas generated in the combustion chamber to flow therein and cause a heat exchange to occur between the combustion gas and the heat medium flowing outside the plurality of tubes, a plurality of turbulators each coupled to an inner side of a corresponding one of the plurality of tubes and configured to induce occurrence of a turbulent flow in the flow of the combustion gas, multi-stage barriers disposed between the outer shell and the plurality of tubes and configured to induce a heat medium flow direction to be alternately changed between a radially inward direction and a radially outward direction, and a lower plate having an end plate structure that is configured to support a lower end portion of the plurality of tubes;
a firing rod assembly assembled to pass through one side portion of the mix chamber to one side of the flat plate-shaped burner and configured to extend across an upper portion of the combustion chamber toward a lower side of the flat plate-shaped burner;
a sealing means configured to block leakage of mixed gas of the mixing space and exhaust gas of the combustion chamber to the outside through a gap between the mix chamber and the firing rod assembly; and
an air-cooled cooling means and a water-cooled cooling means configured to prevent damage caused by degradation of the sealing means by blocking transfer of combustion heat generated in the combustion chamber to the sealing means.

2. The smoke tube boiler of claim 1, wherein:
a mix chamber flange and a burner flange are disposed to come in contact with each other at the one side portion of the mix chamber and seal the mixing space; and
the sealing means includes a first sealing member disposed at a portion where the mix chamber flange and the burner flange come in contact with each other and configured to prevent leakage of the mixed gas.

3. The smoke tube boiler of claim 2, wherein:
the firing rod assembly includes a firing rod and a flame sensing rod;
a firing rod coupling plate to which the firing rod is coupled by passing therethrough and a flame sensing rod coupling plate to which the flame sensing rod is coupled by passing therethrough are disposed at an upper portion of the one side portion of the mix chamber; and
the sealing means is disposed between the upper portion of the one side portion of the mix chamber and the firing rod coupling plate and between the upper portion of the one side portion of the mix chamber and the flame sensing rod coupling plate.

4. The smoke tube boiler of claim 1, wherein a space between a lower surface of the mix chamber body and an upper surface of the flat plate-shaped burner is formed in a flat disc shape.

5. The smoke tube boiler of claim 1, wherein:
a mix chamber flange and a burner flange are disposed to come in contact with each other at the one side portion of the mix chamber and seal the mixing space;
the firing rod assembly is assembled to pass through the mix chamber flange and the burner flange; and
the air-cooled cooling means allows the mix chamber flange and the burner flange to be cooled by mixed gas introduced into the mixing space.

6. The smoke tube boiler of claim 1, wherein:
a mix chamber flange and a burner flange are disposed to come in contact with each other at the one side portion of the mix chamber and seal the mixing space;
the firing rod assembly is assembled to pass through the mix chamber flange and the burner flange; and
the water-cooled cooling means is disposed to allow an upper plate flange, which is formed at an upper end of the upper plate that comes in contact with the heat medium of the water tank, to come in surface contact with the burner flange so that the burner flange is cooled.

7. The smoke tube boiler of claim 1, wherein a round portion configured to provide support against a water pressure of the heat medium stored in the water tank is formed at an upper portion of the upper plate.

8. The smoke tube boiler of claim 1, wherein a height between a lower surface of the flat plate-shaped burner that is inserted into the upper plate and a bottom surface of the upper plate is set so that an end of a flame generated in the flat plate-shaped burner is spaced a predetermined distance apart from the bottom surface of the upper plate.

9. The smoke tube boiler of claim 1, further comprising a pre-mixing chamber having a space provided therein in which air for combustion and gas which are supplied to the mix chamber are pre-mixed,
wherein the space in which the air and gas are pre-mixed is divided in multiple stages by a Venturi structure inside the pre-mixing chamber; and
a direction of flow of the gas supplied into the pre-mixing chamber and a direction of flow of the air supplied into the pre-mixing chamber are parallel.

10. The smoke tube boiler of claim 9, further comprising a mixture regulating part configured to open and close flow paths of the air and gas that pass through the pre-mixing chamber and regulate a supply flow rate of the mixture.

11. The smoke tube boiler of claim 10, wherein:
the pre-mixing chamber is divided into a first path and a second path by a partition member disposed therebetween; and
an air flow path and a gas flow path connected to the first path are in an open state at all times, and an air flow path and a gas flow path connected to the second path are opened and closed by the mixture regulating part.

12. The smoke tube boiler of claim 11, wherein:
a first gas distributing member configured to distribute and supply gas supplied from a first gas supply hole to a throat portion of the first path is coupled to the first path; and
a second gas distributing member configured to distribute and supply gas supplied from a second gas supply hole to a throat portion of the second path is coupled to the second path.

13. The smoke tube boiler of claim 11, wherein:
the mixture regulating part includes a first opening/closing member configured to open and close a flow path of air passing through the second path and a second opening/closing member configured to open and close a flow path of gas that is connected to the second path; and
opening/closing operations of the first opening/closing member and the second opening/closing member are simultaneously performed by interlocking.

14. The smoke tube boiler of claim 13, wherein:
the first opening/closing member includes a body coupled to a rotating shaft of a driving part and disposed in a transverse direction in the second path and a wing portion formed in a size corresponding to the second path and coupled to oppose an outer side surface of the body; and
the second opening/dosing member reciprocates in the transverse direction by interlocking with rotation of the first opening/closing member.

15. The smoke tube boiler of claim 14, wherein:
a first sharp edge portion configured to protrude toward the second opening/closing member and a first bottom portion recessed in the opposite direction are alternately formed in the circumferential direction on the body of the first opening/closing member, and a first inclined portion is formed in a section between the first sharp edge portion and the first bottom portion;
a second sharp edge portion, a second bottom portion, and a second inclined portion which have shapes corresponding to the first sharp edge portion, the first bottom portion, and the first inclined portion are formed on a body of the second opening/closing member; and
the second opening/closing member is elastically supported by an elastic member so as to be pressed toward the first opening/closing member.

16. The smoke tube boiler of claim 15, wherein:
the second opening/closing member further includes a guide member configured to guide the body of the second opening/closing member to reciprocate; and
a guide groove and a guide rib are formed at corresponding positions in the body of the second opening/closing member and the guide member, respectively.

17. The smoke tube boiler of claim 16, wherein:
at the time of contact between the first sharp edge portion of the body of the first opening/closing member and the second bottom portion of the body of the second opening/closing member and contact between the first bottom portion of the body of the first opening/closing member and the second sharp edge portion of the body of the second opening/closing member, while the wing portion of the first opening/closing member is disposed in a direction parallel to a transverse cross-section of the second path so that flow of air to the second path is blocked, the second opening/closing member is moved toward one side and comes in close contact with a communication hole disposed in the gas flow path connected to the second path so that flow of gas to the second path is blocked; and
at the time of contact between the first sharp edge portion of the body of the first opening/closing member and the second sharp edge portion of the body of the second opening/closing member, while the wing portion of the first opening/closing member is disposed in a direction perpendicular to the transverse cross-section of the second path so that the second path is opened, the second opening/closing member is moved toward the other side and spaced apart from the communication hole so that the gas flow path connected to the second path is opened.

* * * * *